US009542175B2

(12) United States Patent
Tseitlin et al.

(10) Patent No.: US 9,542,175 B2
(45) Date of Patent: Jan. 10, 2017

(54) CONTINUOUS DEPLOYMENT

(75) Inventors: Ariel D. Tseitlin, Sunnyvale, CA (US);
Daniel Kearns, Moss Beach, CA (US)

(73) Assignee: Oracle International Corporation,
Redwood Shores, CA (US)

( * ) Notice: Subject to any disclaimer, the term of this patent is extended or adjusted under 35 U.S.C. 154(b) by 1259 days.

(21) Appl. No.: 11/426,250

(22) Filed: Jun. 23, 2006

(65) Prior Publication Data
US 2007/0250574 A1 Oct. 25, 2007

Related U.S. Application Data

(60) Provisional application No. 60/693,587, filed on Jun. 24, 2005.

(51) Int. Cl.
| | | |
|---|---|---|
| *G06F 9/44* | (2006.01) | |
| *H04L 29/06* | (2006.01) | |
| *G06F 9/54* | (2006.01) | |
| *G06F 9/445* | (2006.01) | |
| *G06Q 10/06* | (2012.01) | |
| *G06Q 10/10* | (2012.01) | |

(52) U.S. Cl.
CPC . *G06F 8/71* (2013.01); *G06F 8/61* (2013.01); *G06F 9/54* (2013.01); *H04L 67/40* (2013.01); *G06Q 10/06* (2013.01); *G06Q 10/10* (2013.01)

(58) Field of Classification Search
CPC .............. G06F 9/46; G06F 9/465; G06F 9/54; G06F 9/548; G06F 8/60–8/78; H04L 67/40
USPC .................................. 717/168–178; 719/330
See application file for complete search history.

(56) References Cited

U.S. PATENT DOCUMENTS

| | | | | |
|---|---|---|---|---|
| 5,067,072 | A | | 11/1991 | Talati et al. .................... 717/148 |
| 5,175,856 | A | | 12/1992 | Van Dyke et al. ........... 717/151 |
| 5,179,703 | A | | 1/1993 | Evans ............................ 717/122 |
| 5,339,430 | A | * | 8/1994 | Lundin et al. ................. 717/170 |
| 5,432,937 | A | | 7/1995 | Tevanian et al. .............. 717/162 |
| 5,583,983 | A | * | 12/1996 | Schmitter ...................... 717/138 |
| 5,625,804 | A | * | 4/1997 | Cooper et al. ................ 717/170 |
| 5,644,771 | A | * | 7/1997 | Endicott et al. .............. 717/170 |
| 5,826,265 | A | * | 10/1998 | Van Huben et al. . 707/E17.005 |
| 5,920,867 | A | * | 7/1999 | Van Huben et al. . 707/E17.007 |
| 5,943,674 | A | * | 8/1999 | Schofield ...................... 717/140 |

(Continued)

OTHER PUBLICATIONS

IBM. "IBM Terminology—terms E" pp. 1, 22, 55, and 56. Retrieved from http://www-01.ibm.com/software/globalization/terminology/e.html on Sep. 2, 2011.*

(Continued)

*Primary Examiner* — Emerson Puente
*Assistant Examiner* — Erika Kretzmer
(74) *Attorney, Agent, or Firm* — Sheppard, Mullin, Richter & Hampton LLP

(57) ABSTRACT

A method is provided. The method stores a first version of an artifact in a first environment. Further, the method stores a second version of the artifact in the first environment. In addition, the second version of the artifact is distinct from the first version of the artifact. The method also deploys the first version of the artifact and the second version of the artifact to a second environment so that the first artifact and the second artifact can be run simultaneously in the second environment. The second environment is distinct from the first environment.

26 Claims, 20 Drawing Sheets

(56) References Cited

U.S. PATENT DOCUMENTS

| | | | |
|---|---|---|---|
| 6,018,627 A | 1/2000 | Iyengar et al. | 717/103 |
| 6,066,181 A * | 5/2000 | DeMaster | 717/148 |
| 6,074,432 A | 6/2000 | Guccione | 717/163 |
| 6,151,643 A * | 11/2000 | Cheng et al. | 709/200 |
| 6,154,878 A | 11/2000 | Saboff | 717/173 |
| 6,199,195 B1 * | 3/2001 | Goodwin et al. | 717/108 |
| 6,286,134 B1 | 9/2001 | Click et al. | 717/138 |
| 6,330,569 B1 * | 12/2001 | Baisley et al. | 717/168 |
| 6,408,311 B1 * | 6/2002 | Baisley et al. | 707/999.203 |
| 6,442,752 B1 | 8/2002 | Jennings et al. | 717/162 |
| 6,473,748 B1 * | 10/2002 | Archer | 706/45 |
| 6,477,434 B1 | 11/2002 | Wewalaarachchi et al. | 700/83 |
| 6,526,457 B1 | 2/2003 | Birze | 708/104 |
| 6,571,140 B1 | 5/2003 | Wewalaarachchi et al. | 700/83 |
| 6,584,507 B1 * | 6/2003 | Bradley et al. | 709/229 |
| 6,738,967 B1 | 5/2004 | Radigan | 717/146 |
| 6,738,975 B1 * | 5/2004 | Yee et al. | 719/310 |
| 6,757,893 B1 * | 6/2004 | Haikin | 717/170 |
| 6,782,448 B2 * | 8/2004 | Goodman et al. | 717/170 |
| 6,865,733 B2 * | 3/2005 | Broussard | 717/147 |
| 6,871,344 B2 * | 3/2005 | Grier | G06F 8/54 717/162 |
| 6,915,513 B2 | 7/2005 | Duesterwald et al. | 717/169 |
| 6,971,090 B1 * | 11/2005 | Gruttadauria et al. | 717/136 |
| 7,003,783 B2 * | 2/2006 | Skaringer et al. | 719/332 |
| 7,051,324 B2 | 5/2006 | Gissel et al. | 717/166 |
| 7,073,170 B2 * | 7/2006 | Grier | G06F 8/54 717/162 |
| 7,076,765 B1 | 7/2006 | Omori | 717/165 |
| 7,225,240 B1 | 5/2007 | Fox et al. | 709/223 |
| 7,234,111 B2 | 6/2007 | Chu et al. | 715/251 |
| 7,287,259 B2 * | 10/2007 | Grier | G06F 8/71 717/164 |
| 7,293,261 B1 * | 11/2007 | Anderson et al. | 717/137 |
| 7,293,262 B2 * | 11/2007 | Sengodan | 717/136 |
| 7,305,669 B2 * | 12/2007 | Roush | 717/170 |
| 7,313,782 B2 | 12/2007 | Lurie et al. | 717/168 |
| 7,340,718 B2 | 3/2008 | Szladovics et al. | 717/106 |
| 7,434,213 B1 | 10/2008 | Prakash et al. | 717/152 |
| 7,444,625 B2 | 10/2008 | Anwar et al. | 717/140 |
| 7,458,073 B1 * | 11/2008 | Darling et al. | 717/168 |
| 7,519,951 B2 * | 4/2009 | Deedwaniya | G06F 9/44521 719/332 |
| 7,562,358 B2 | 7/2009 | Bennett et al. | 717/170 |
| 7,610,316 B2 * | 10/2009 | Bartz et al. | 717/170 |
| 7,627,867 B2 * | 12/2009 | Banks | G06F 17/30286 709/203 |
| 7,694,277 B2 * | 4/2010 | Yuknewicz | G06F 8/71 717/121 |
| 7,770,158 B2 | 8/2010 | Osborne et al. | 717/116 |
| 7,779,405 B2 | 8/2010 | Gorti | 717/172 |
| 7,886,028 B2 * | 2/2011 | Tseitlin et al. | 709/217 |
| 7,984,434 B1 * | 7/2011 | Gathoo | G06F 8/65 717/170 |
| 8,332,830 B2 * | 12/2012 | Kantorowitz et al. | 717/148 |
| 8,635,595 B2 | 1/2014 | Melillo | 717/120 |
| 2002/0019972 A1 * | 2/2002 | Grier | G06F 8/71 717/122 |
| 2002/0100017 A1 * | 7/2002 | Grier | G06F 8/54 717/120 |
| 2002/0107995 A1 * | 8/2002 | Skaringer et al. | 717/173 |
| 2002/0116698 A1 | 8/2002 | Lurie et al. | 717/100 |
| 2003/0101431 A1 | 5/2003 | Duesterwald et al. | 717/126 |
| 2003/0110024 A1 * | 6/2003 | Broussard | 704/200 |
| 2003/0221190 A1 * | 11/2003 | Deshpande | G06F 8/61 717/170 |
| 2003/0233631 A1 | 12/2003 | Curry et al. | 717/100 |
| 2004/0015816 A1 | 1/2004 | Hines et al. | 717/101 |
| 2004/0143826 A1 | 7/2004 | Gissel et al. | 717/162 |
| 2004/0181779 A1 | 9/2004 | Gorti | 717/120 |
| 2004/0187140 A1 * | 9/2004 | Aigner et al. | 719/328 |
| 2004/0216133 A1 * | 10/2004 | Roush | 719/316 |
| 2004/0223009 A1 | 11/2004 | Szladovics et al. | 345/760 |
| 2005/0034137 A1 * | 2/2005 | Bartz et al. | 719/328 |
| 2005/0037735 A1 | 2/2005 | Coutts | 455/411 |
| 2005/0081184 A1 * | 4/2005 | Deedwaniya | G06F 9/44521 717/100 |
| 2005/0097543 A1 * | 5/2005 | Hirayama | G06F 8/65 717/173 |
| 2005/0144591 A1 * | 6/2005 | Banks | G06F 17/30286 717/122 |
| 2005/0160104 A1 | 7/2005 | Meera et al. | 707/100 |
| 2005/0166196 A1 * | 7/2005 | Grier | G06F 8/54 717/162 |
| 2005/0240558 A1 | 10/2005 | Gil et al. | 707/1 |
| 2006/0031827 A1 * | 2/2006 | Barfield | G06F 8/65 717/168 |
| 2006/0075398 A1 | 4/2006 | Bennett et al. | 717/170 |
| 2006/0080680 A1 * | 4/2006 | Anwar | G06F 9/44521 719/328 |
| 2006/0080682 A1 | 4/2006 | Anwar et al. | 719/331 |
| 2006/0101429 A1 | 5/2006 | Osborne et al. | 717/137 |
| 2006/0117298 A1 | 6/2006 | Delapedraja et al. | 717/120 |
| 2006/0184980 A1 | 8/2006 | Cole | 725/100 |
| 2007/0022404 A1 | 1/2007 | Zhang et al. | 717/103 |
| 2007/0226682 A1 | 9/2007 | Kilgore et al. | 717/106 |
| 2007/0250575 A1 | 10/2007 | Tseitlin et al. | 709/205 |
| 2007/0260629 A1 | 11/2007 | Tseitlin et al. | 707/102 |
| 2008/0141231 A1 | 6/2008 | Kantorowitz et al. | 717/147 |
| 2009/0279556 A1 * | 11/2009 | Selitser | H04L 67/101 370/401 |
| 2010/0299590 A1 | 11/2010 | Gissler et al. | 715/239 |
| 2013/0219370 A1 | 8/2013 | Beale et al. | 717/128 |

OTHER PUBLICATIONS

Polze, Andreas, "Component Programming with J2EE and .NET."; Feb. 27, 2004, Discourse lectures at the Berlin Distributed Computing Laboratory, Downloaded from http://user.cs.tu-berlin.de/~mwerner/discourse/BlockLVS04/slides/Components.pdf on Jun. 14, 2004; pp. 1-10.

Moore, Bill, et al., "Migrating WebLogic Applications to WebSphere Advanced Edition," IBM Redbooks, Jan. 2001, pp. 17-31.

Gregory, Kate, "Microsoft® Visual C++®.NET 2003," Dec. 2003, Sams Publishing, pp. 92-108.

SGI, Building Software for Multiple Architectures, Silicon Graphics International Corp. (Jul. 21, 1994) retrieved from http://techpubs.sgi.com/library/tpl/cgi-bin/getdoc.cgi?coll=0620&&db=bks&srch=&fname=/SGI_End User/ClrC_UG/sgi_hmtl/ch14.html on.

Delorie Software, 2.1, Command Line Options, delore.com (Jun. 2003) retrieved from http://www.delore.com/gnu/docs/binutils/ID_3.html on Sep. 27, 2014; 6 pages.

* cited by examiner

CONTINUOUS DEPLOYMENT

RELATED APPLICATION

This application claims the benefit of and priority to U.S. Provisional Application Ser. No. 60/693,587 filed Jun. 24, 2005, the contents of which are incorporated by reference herein in its entirety.

BACKGROUND

1. Field

A method and system are disclosed which generally relate to computer application environments.

2. General Background

Computer systems form the backbone of modern business. Computer systems are used in virtually every step of a business chain. For example, computer systems are used to purchase source materials, track production, monitor inventory levels, monitor quality, set pricing, maintain customer relationships, provide accounting services, maintain a payroll, provide employee benefits, track inbound/outbound shipments, track customer satisfaction or complaints, and perform countless other tasks to run a business.

A number of enterprise software applications have been created to allow a business to perform many of these business support functions with a single integrated software application. These enterprise software applications have provided the businesses that employ these applications with a competitive advantage. However, such enterprise software applications tend to be expansive applications that require significant computer resources to run and knowledgeable technicians to maintain. Furthermore, enterprise software applications tend to be expensive programs to purchase or lease. Thus, enterprise software applications have mainly been used only by very large corporations that are able to afford such infrastructure investments and continue to pay for their continued use.

Even very large corporations can have some difficulties with large enterprise software applications. For example, a large corporation may already have a legacy software application that the large corporation wishes to continue using. Thus, integrating the legacy software application with a new enterprise software application can be difficult and require very skilled application integrators.

Furthermore, corporations in different business segments often have very different needs from their enterprise software applications. Therefore, a corporation using a "one-size-fits-all" enterprise software application may find that the "one-size-fits-all" enterprise software includes many unnecessary features. These unnecessary features needlessly cost the corporation money and consume valuable computer resources. The enterprise software application may also be missing a number of desired industry-specific features for each different corporation. These corporations must develop these missing features internally or find another software application that provides the needed features. If an additional software application that provides the missing features is located, then the corporation must integrate that additional application with the enterprise software application.

Due to these difficulties with large enterprise software applications, it would be desirable to find a way to make such enterprise software applications more flexible. Specifically, it would be desirable to allow small businesses to be able to afford some of the features provided by enterprise software applications. Similarly, it would be desirable to allow large corporations to easily select and install only the needed features. And finally, it would be desirable to have an ability to easily integrate the enterprise software application with other customized applications.

SUMMARY

In one aspect of the disclosure, a method is provided. The method stores a first version of an artifact in a first environment. Further, the method stores a second version of the artifact in the first environment. In addition, the second version of the artifact is distinct from the first version of the artifact. The method also deploys the first version of the artifact and the second version of the artifact to a second environment so that the first artifact and the second artifact can be run simultaneously in the second environment. The second environment is distinct from the first environment.

In another aspect of the disclosure, a machine readable medium has stored thereon a set of instructions which when executed perform a method. The method provides a first version of an artifact in an environment. Further, the method provides a second version of the artifact in the environment simultaneously with the first version of the artifact. In addition, the method establishes compatibility between a first interface of the first version of the artifact and a second interface of the second version of the artifact.

In yet another aspect of the disclosure, a system is provided. The system has a unit that provides a first version of a service in an environment. Further, the system has a unit that installs a second version of the service in the environment without affecting the operation of the first version of the service. The system also has a unit that establishes compatibility between a first interface of the first version of the service and a second interface of the second version of the service.

BRIEF DESCRIPTION OF DRAWINGS

The above-mentioned features and objects of the present disclosure will become more apparent with reference to the following description taken in conjunction with the accompanying drawings wherein like reference numerals denote like elements and in which.

DETAILED DESCRIPTION

A method and apparatus for implementing a portable and open standards-based business application platform are disclosed. In the following description, for purposes of explanation, specific nomenclature is set forth to provide a thorough understanding of the present disclosure. However, it will be apparent to one skilled in the art that these specific details are not required in order to practice the method and apparatus disclosed herein. For example, although reference is made to the J2EE and .Net application platforms, the same techniques can easily be applied to other types of application platforms.

Certain computer application tasks require very large and complex computer software applications. For example, running an entire business operation requires a very large application (an "enterprise application") that can handle many different tasks. Providing such large and complex enterprise software applications to a customer can be a great challenge to the enterprise software application developer.

Monolithic Application Executing at Customer Site

Figure 1:
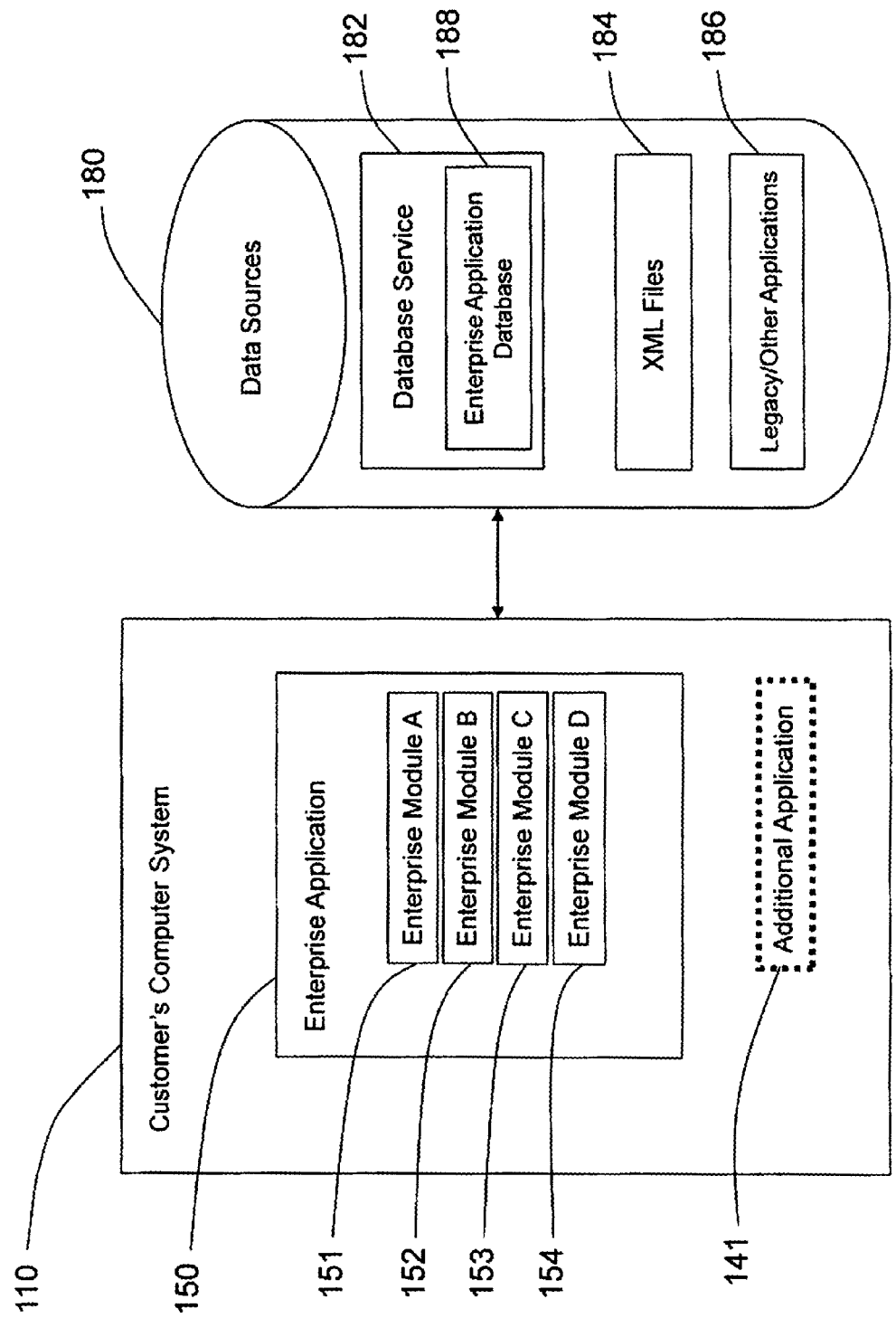
FIG. 1 illustrates infrastructure utilized in a large and complex application, such as an enterprise application.

FIG. 1 illustrates infrastructure utilized in a large and complex application, such as an enterprise application. The infrastructure can be provided to the client by installing the enterprise application onto computers owned by the customer at the customer's premises. For instance, an enterprise application 150 can be installed to run on a customer's computer system 110. The enterprise application 150 may use data and/or services from the data sources 180, which include a database service 182, XML files 184, and legacy/other applications 186. Further, the database service 182 stores an enterprise application database 188.

The enterprise application 150 can be an expensive application, to purchase or lease, which utilizes significant computer resources. Further, installing and maintaining the enterprise software application 150 may require knowledgeable technicians. Thus, a smaller business might not want to use the large and complex enterprise application 150.

Even large corporations with significant computer resources and budgets may have difficulties with the large enterprise application. For example, a large corporation may already have a legacy software application that the corporation wishes to continue using. Thus, integrating the legacy software application with a new enterprise application 150 can be difficult and require very skilled application integrators.

The enterprise application 150 can include a variety of components, which form the building blocks of the enterprise application 150. An example of a component is a module, which is a collection of computer code that can be written to provide a service.

The enterprise application 150 may consist of many different individual modules. For example, as illustrated in FIG. 1, the enterprise application 150 can be composed of four individual enterprise modules: enterprise module A 151, enterprise module B 152, enterprise module C 153, and enterprise module D 154. A customer may need some of the enterprise modules while not needing others. For instance, a corporation may have use for the enterprise module A 151 and the enterprise module B 152, but may have no use for the enterprise module C 153 and the enterprise module D 154. Further, the corporation may need an additional module that is not provided in the enterprise application 150. In those situations, the customer develops internally or purchases an additional application 141 that provides the features of the additional module. If an additional application 141 that provides the missing features is located, then the corporation must integrate that additional application 141 with the enterprise application 150. FIG. 1 illustrates the additional application 141 being integrated with the enterprise application 150. Such development is expensive because technical skills are needed to locate or develop the additional application 141 and then integrate the additional application 141 with the enterprise application 150. Accordingly, the corporation may not find the "one-size-fits-all" enterprise application 150 to be an optimal solution for its needs.

On-Line or Hosted Application Services

Figure 2:
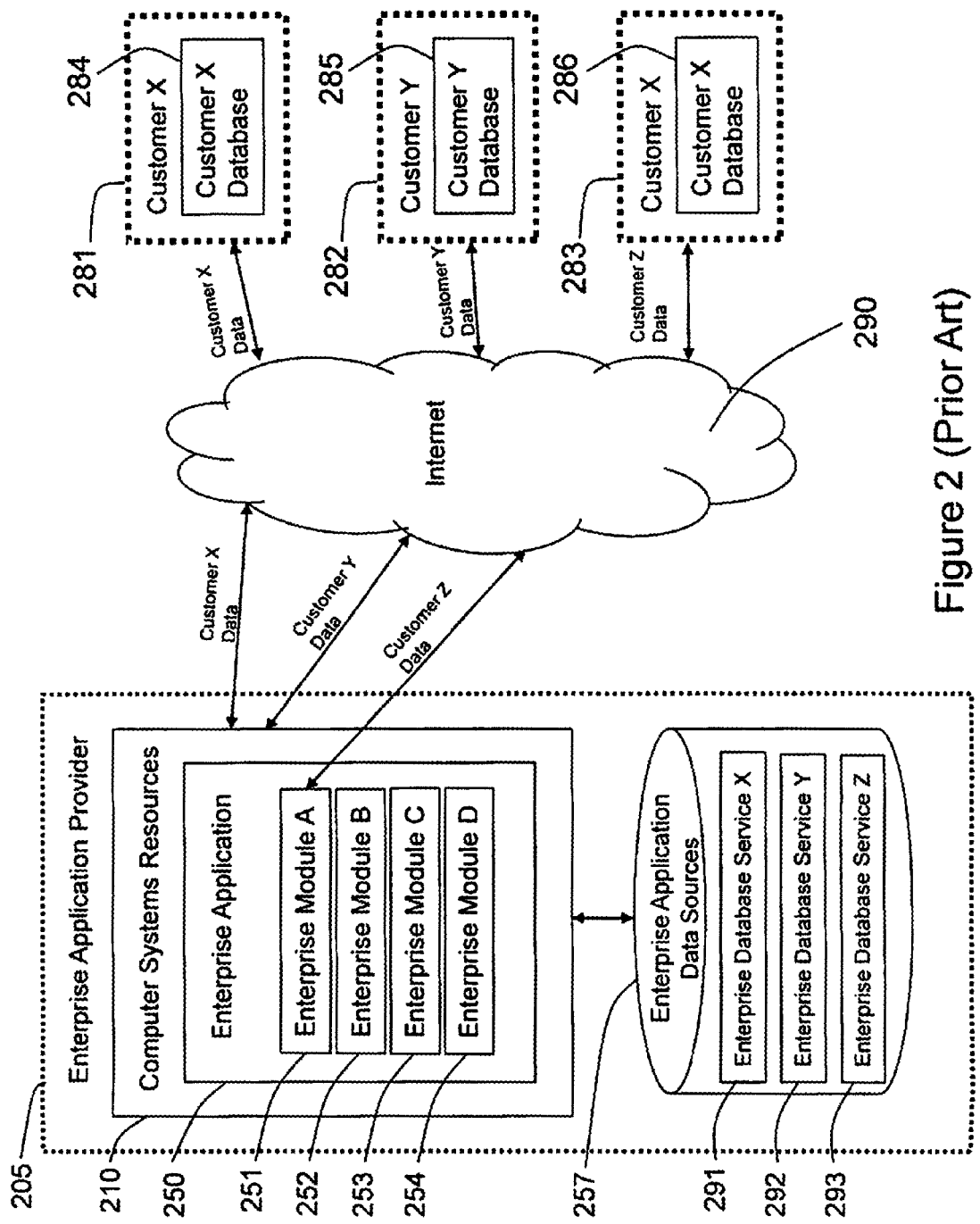
FIG. 2 illustrates an on-line or hosted infrastructure that can be utilized to provide an enterprise application over the Internet.

As an alternative to the monolithic enterprise software applications discussed above, enterprise application services can be provided to customers over the Internet. FIG. 2 illustrates an on-line or hosted infrastructure that can be utilized to provide an enterprise application 250 over the Internet 290. Specifically, an enterprise application provider 205 hosts the enterprise application 250 on a server and allows customers to access the server on-line. The server can be located at the enterprise application provider's facility. The enterprise application 250 mainly uses computer system resources 210 provided by the enterprise application provider 205. Enterprise application 250 includes enterprise module A 251, enterprise module B 252, enterprise module C 252, and enterprise module D 254. Customers such as customer X 281, customer Y 282, and customer Z 283 can access the enterprise application 250 over the Internet 290. Each of the customers can have a database. For instance, the customer X 281 may have a customer X database 284, the customer Y 282 may have a customer Y database 285, and the customer Z 283 may have a customer Z database 286. The enterprise application provider 205 keeps track of the different customer data using different database services in the enterprise application data sources 257, such as enterprise database service X 291 for customer X 281, enterprise database service Y 292 for customer Y 282, and enterprise database service Z 293 for customer Z 283.

Accordingly, the infrastructure of FIG. 2 allows small businesses to enjoy enterprise application services without needing to install and maintain a large enterprise application. Customers can access, and pay for, only portions of the enterprise application 250. For example, the customers X 281 and Y 282 send and receive data to and from all of the computer resources 210, thereby accessing the entire enterprise application 250 and all the enterprise modules A 251-D 254, while customer Z 283 sends and receives data to and from only the enterprise module A 251, thereby accessing only enterprise application module A 251.

Enterprise Module Assembly of Enterprise Application Services

A customer that prioritizes having the enterprise application 150 on the customer's premises may purchase the "one-size-fits-all" enterprise application 150 of FIG. 1. Further, a customer that prioritizes maintaining low costs, e.g., a small business, may purchase individual modules of the enterprise application 250 of FIG. 2 to obtain limited enterprise application services at a lower cost than purchasing the entire "one-size-fits-all" enterprise application 150.

Figure 3:
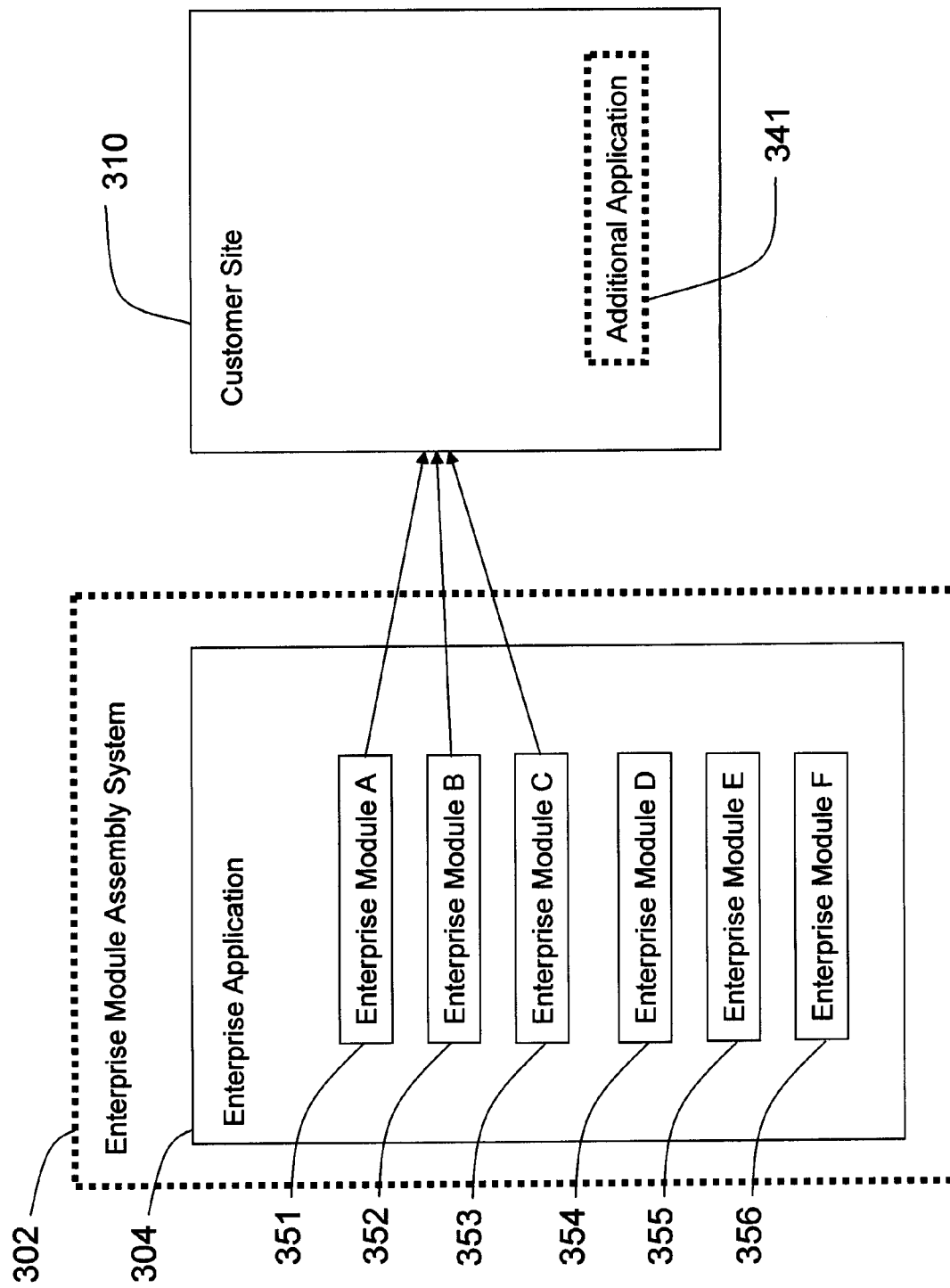
FIG. 3 illustrates an enterprise module assembly system that allows a customer to both host the enterprise application software locally and only purchase the particular modules corresponding to the services that the customer actually needs.

FIG. 3 illustrates an enterprise module assembly system 302 that allows a customer to both host the enterprise application software locally and only purchase the particular modules corresponding to the services that the customer actually needs. In addition, the enterprise module assembly system 302 allows a customer to integrate existing and/or new software on the customer's system with the enterprise modules that are purchased. Accordingly, the customer can assemble enterprise modules for particular services of an enterprise application in combination with the existing and/or new software on the customer's system.

In one embodiment, the enterprise module assembly system 302 breaks up an enterprise application 304 into individual enterprise modules. The enterprise application 304 can be a large complex computer application, e.g. an enterprise application or an even larger complex application program. The customer can then select the individual enterprise modules that the customer would like to utilize. Each of the enterprise modules can provide a different service. For instance, the enterprise application 304 may provide an enterprise module A 351 for purchasing source materials, an enterprise module B 352 for tracking production, an enterprise module C 353 for monitoring inventory levels, an enterprise module D 354 for monitoring quality, an enterprise module E 355 for setting pricing, and an enterprise module F 356 for maintaining customer relationships. The customer may then select which of these enterprise modules it would like to purchase. For instance, in FIG. 3, the customer has selected the enterprise module A, the enterprise module B, and the enterprise module C, but has not selected the enterprise module D, the enterprise module E, or the enterprise module F. The customer may not have selected the enterprise module D because the customer may already have existing software for monitoring quality. Further, the customer may not have selected the enterprise module E because, in the context of its business, the customer does not need any software for setting pricing. Finally, the customer may not have selected the enterprise module F because the customer plans on internally developing an additional application 341 for maintaining customer relationships.

The enterprise modules can be provided to the customer in a variety of ways. For instance, technicians can physically install the enterprise modules, which the customer has selected, at the customer site 310. Alternatively, the enterprise modules can be transmitted through a network, such as the Internet, to the customer site 310.

In another embodiment, the enterprise module assembly system 302 creates the enterprise modules as opposed to breaking up an existing enterprise application 304. In other words, the enterprise module assembly system 302 can create a collection of enterprise modules, each corresponding to a particular service, and allow a customer to select the enterprise modules that it would like to utilize.

Figure 4:
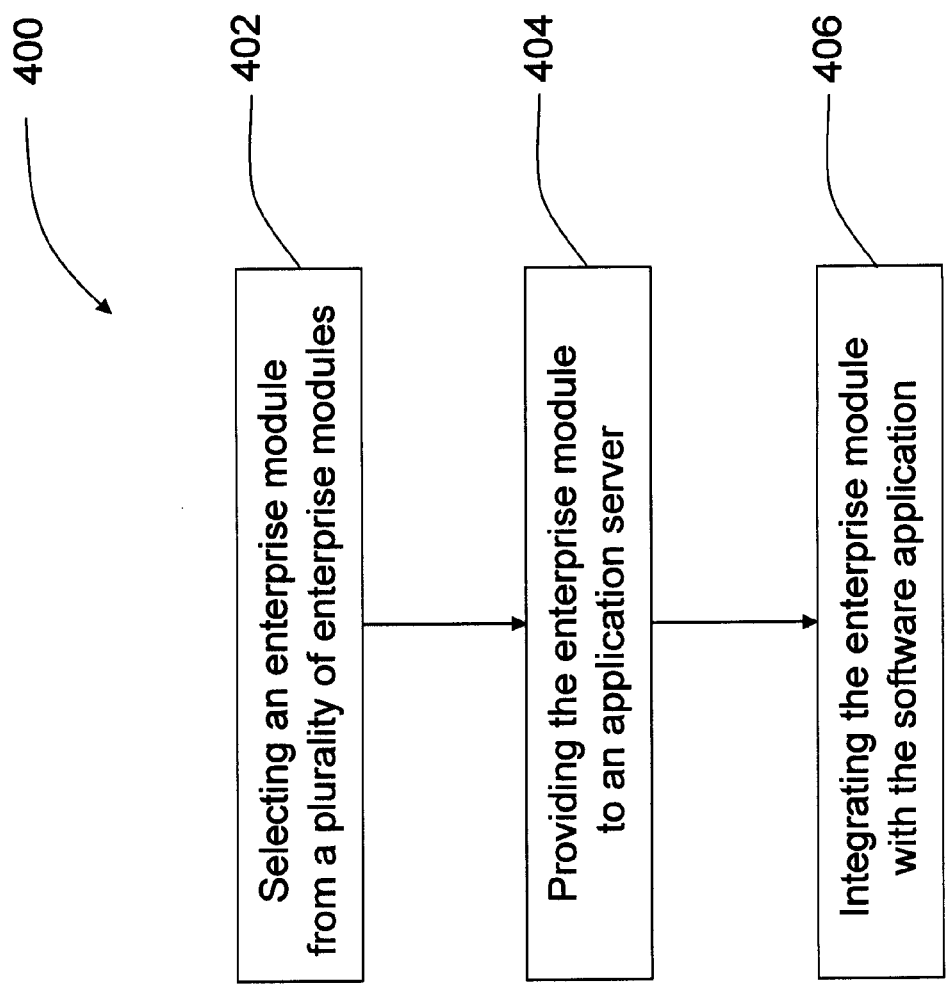
FIG. 4 illustrates a process of enhancing a computer system.

FIG. 4 illustrates a process 400 of enhancing a computer system. At a process block 402, the process 400 selects an enterprise module from a plurality of enterprise modules. The plurality of enterprise modules composes an enterprise application. Further, each of the enterprise modules includes enterprise object code generated from platform dependent source code and at least a subset of a plurality of platform dependent artifacts. As will be explained below, a developer can utilize the following to compose one of the enterprise modules: (1) high-level abstract languages to automatically generate platform dependent artifacts and (2) platform independent source code. The developer can essentially proceed with development in a portable manner because the developer can utilize a certain set of high-level abstract languages and platform independent source code irrespective of the customer's native software and hardware environment. Further, the enterprise module is developed according to an open standard because the enterprise object code is platform dependent to the specific customer's native software and hardware environment. At a process block 404, the enterprise module is provided to an application server. The application server stores a software application, which is generated from platform dependent object code. In addition, at a process block 406, the enterprise module is integrated with the software application.

Figure 5:
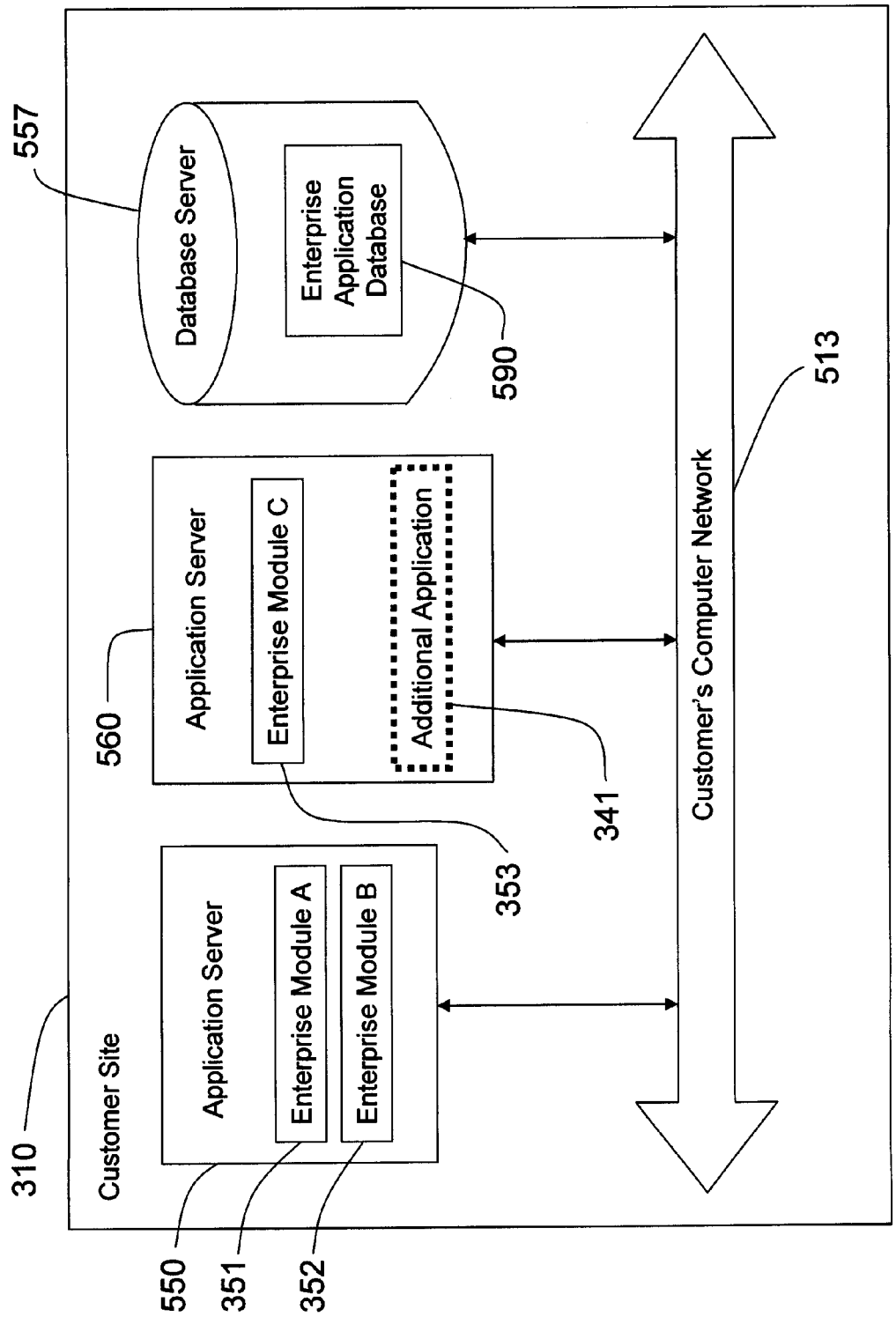
FIG. 5 illustrates an expanded view of the customer site, as seen in FIG. 3, for which the customer can implement the selected enterprise modules.

FIG. 5 illustrates an expanded view of the customer site 310, as seen in FIG. 3, for which the customer can implement the selected enterprise modules. For example, as seen in FIG. 3, the customer selects the enterprise module A, the enterprise module B, and the enterprise module C, but not the enterprise module D, the enterprise module E, or the enterprise module F. The customer may implement the selected enterprise modules on application servers, as illustrated in FIG. 5. For instance, the customer can host the enterprise module A 351 and the enterprise module B 352 on an application server 550. The application server 550 can then provide the services offered by the enterprise module A 351 and the enterprise module B 352. Further, the customer can host the enterprise module C 353 on a different application server 560. The other application server 560 may also host the additional application 341 that the customer internally developed, purchased, etc. In one embodiment, the additional application 341 includes platform dependent object code that is specific to the software and hardware at the customer site 310. While a developer composing the enterprise module C 353 was able to utilize high-level abstract languages and platform independent source code to prepare the code for the enterprise module C 353, the packaged enterprise module C 353 includes enterprise object code that is platform dependent specific to the software and hardware at the customer site 310. Since the enterprise module C 353 and the additional application 341 both include platform dependent object code compatible with the same platform, the enterprise module C 353 and the additional application 341 can be easily integrated with one another.

In addition, the customer site 310 has an enterprise application database 590 that is hosted on a database server 557. The enterprise application database 557 can store information related to each of the enterprise modules and the additional application 341 so that particular enterprise modules and/or the additional application 341 can be searched for. In addition, the customer site 310 has a computer network 513 through which the enterprise module A 351, the enterprise module B 352, the enterprise module C 353, the additional application 341, and the enterprise application database service 590 can all communicate with one another.

For instance, although the enterprise module A 351 is stored on a different server than the additional application 341, the enterprise module A 351 and the additional application 341 can still communicate with one another.

Accordingly, a customer can utilize some or all of the individual enterprise modules from the enterprise application 304 (FIG. 3). The customer site 310, as illustrated in FIG. 5, can provide an open standards platform that has many tools and services for application development, application integration, and application management. Thus, a customer can easily create new application programs, e.g., the additional application 341, integrate the new application programs with the enterprise modules, and manage the enterprise modules and the new applications.

Composition of an Enterprise Module

A discussion shall now be provided regarding how an enterprise module is generated. For ease of discussion, the enterprise module A 351, as seen in FIG. 3, shall be utilized as an example of an enterprise module.

The enterprise module A 351 is constructed so that it (1) is portable and (2) utilizes an open standards platform. By being portable, the code utilized to create the enterprise module A 351 can compile and run on more than one application platform. For ease of discussion, examples shall be provided herein that utilize J2EE and .Net, which are well known platforms to one of ordinary skill in the art. However, other platforms known to one of ordinary skill in the art can easily be utilized. By being open, as discussed above, the enterprise object code included in the enterprise module A 351 is platform dependent so that the enterprise module A 351 can be easily integrated with other applications, e.g. the additional application 341 (FIG. 3), that have object code for the same platform that the customer utilizes.

Figure 6:
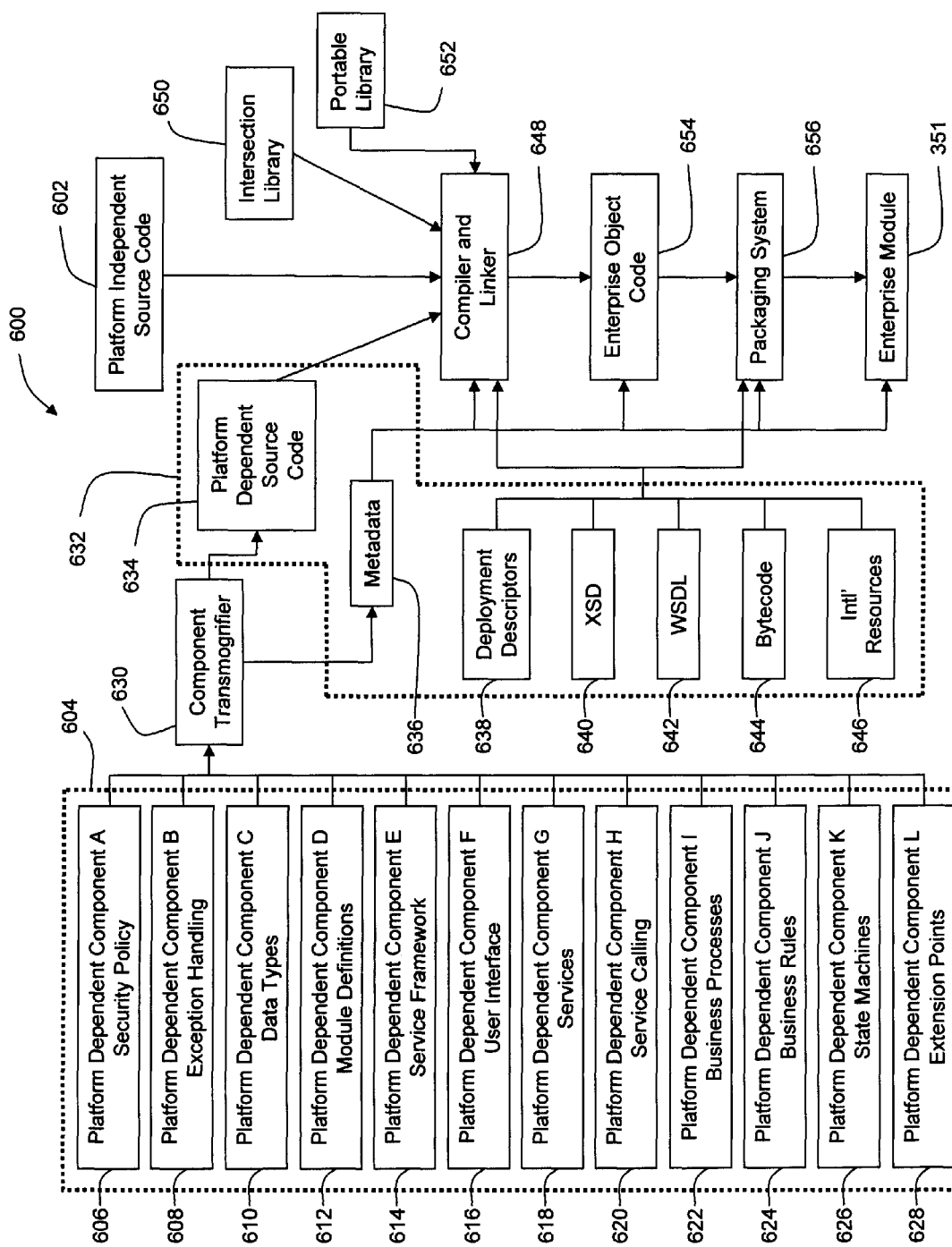
FIG. 6 illustrates an enterprise module production environment.

FIG. 6 illustrates an enterprise module production environment 600. The enterprise module production environment 600 can be utilized to construct the enterprise module A 351. The enterprise module A 351 is essentially constructed by combining platform independent source code 602 and a plurality of platform dependent components 604.

Initially, a developer determines what components of the enterprise module are platform independent and what components are platform dependent. In other words, in order for the enterprise module to eventually become native to a customer's system, some components of the enterprise module will require data specific to the individual customer's platform while other components of the enterprise module will not require data specific to the individual customer's platform.

The main algorithms utilized by the enterprise module A 351 are mostly not specific to the actual platform on which the enterprise module A 351 is being implemented. Accordingly, a large portion of these algorithms can be coded in platform independent source code 602. The platform independent source code 602 can be a subset of the syntax language of one or more platform independent languages. Accordingly, the platform independent source code 602 can be compiled on any of the compilers that support one of the platform independent languages utilized for the subsets. For instance, the platform independent source code 602 can be a subset of the syntax language for .Net and J2EE. If the function for concatenate is "concat" in both .Net and J2EE, then the subset includes the function "concat". If the compiler supports .Net, then the use of the function "concat" is accepted by the compiler. Similarly, if the compiler supports J2EE, then the use of the function "concat" is also accepted by the compiler. An example of a subset of syntax language is a subset of the Java 1.1.4 computer language. The subset can be compiled on either a .Net or J2EE compiler.

However, some services are platform specific. For instance, the security policy for the enterprise module A 351 may vary significantly from one platform to another. The high-level abstract languages provide the developer with a way of coding the plurality of platform dependent components 604 in a portable manner. In other words, the developer does not have to actually code each of the platform dependent components 604 according to the individual customer's native platform. The developer can utilize the same high-level abstract language to code a particular platform dependent component 604 for different customers with different native platforms.

FIG. 6 illustrates platform dependent component A 606 for Security Policy, platform dependent component B 608 for Exception Handling, platform dependent component C 610 for Data Types, platform dependent component D 612 for Module Definitions, platform dependent component E 614 for Service Framework, platform dependent component F 616 for User Interface, platform dependent component G 618 for Services, platform dependent component H 620 for Service Calling, platform dependent component I 622 for Business Processes, platform dependent component J 624 for Business Rules, platform dependent component K 626 for State Machines, and platform dependent component L 628 for Extension Points. These are merely examples of different platform dependent components. A subset of the platform dependent components illustrated, a combination of the platform dependent components illustrated, or completely different platform dependent components may be utilized.

An example of a developer utilizing high-level abstract languages would involve the developer utilizing XML to code the platform dependent component A 606 for Security Policy and Java to code the platform dependent component B 608 for Exception Handling. In other words, the security policy on different customer systems may be significantly different, but the developer can utilize XML to code the platform dependent component A 606 for Security Policy customers with different platforms. Further, the developer can utilize Java to code the platform dependent component B 608 for Exception Handling for different customers. While a different high-level abstract language could potentially be utilized to code each platform dependent component 604, one high-level abstract language could also be used for all of the platform dependent components 604. In addition, a set of high-level abstract languages can be utilized so that each high-level abstract language may be utilized to code more than one of the platform dependent components 604. For example, XML and Java can be utilized for the plurality of platform dependent components 604 so that half of the platform dependent components 604 are coded in XML and half of the platform dependent components 604 are coded in Java. In an alternative embodiment, some of the platform dependent components illustrated in FIG. 6 may not be native to an individual customer's platform, and the developer may choose to classify those components as platform independent components.

The enterprise module production environment 600 provides the platform dependent components 604, coded in the high-level abstract language, to a component transmogrifier 630. Further, the component transmogrifier 630 has data regarding the platform specifics of the particular customer for which the enterprise module A 351 is being developed. Accordingly, the component transmogrifier 630 can automatically convert the code written by the developer for the platform dependent components 604 into platform dependent source code 634. In other words, the developer can utilize the same high-level abstract language to generate platform dependent source code for different platforms. The developer does not have to waste the resources that would be needed to become familiar with the computer languages utilized for each customer's platform.

The component transmogrifier 630 can output a plurality of platform dependent artifacts 632. For example, the platform dependent source code 634 is a platform dependent artifact. Metadata 636 is also an example of a platform dependent artifact. The metadata 636 can be any data associated with the enterprise module A 351. For instance, the metadata 636 can provide information for a graphical user interface, such as field names. Other examples of platform dependent artifacts 632 are deployment descriptors 638, XML Schema Definition 640 ("XSD"), Web Services Description Language 642 ("WSDL"), Bytecode 644, and International resources 646. The International resources include mainly localizable artifacts, such as localized strings, dialogs, screens, etc.

Further, the plurality of platform dependent artifacts 632, such as the platform dependent source code 634, are provided to the compiler and linker 648 so that the platform dependent source code 634 can be compiled and linked with the platform independent source code 602. As a result, enterprise object code 654 is generated.

In order to help facilitate software development, the module construction system 600 provides libraries of pre-constructed code that the developer can utilize when programming in the native platform computer languages. As the module construction system 600 is portable, a developer can access pre-constructed routines for any of the native platform computer languages that are utilized. Further, an intersection library 650 includes the set of routines that is commonly available in each of the native platform computer language libraries. An intersection occurs when the same name of a function appears through each of the native computer language libraries that are being utilized. For instance, a function to change the orientation of an object may be called "reorient" in both C# and Java. Even though the underlying code for the function "reorient" may be different in C# than in Java, a compiler that supports either C# or Java can be utilized to change the orientation of the object. However, if the name of the function in C# is "reorient" and the name of the function in Java is "rotate," the two functions may be found in the portable library 652. Further, if there is a function in C# called "reorient," but no function in Java, then a function is composed in Java and placed in the portable library 652. In one embodiment, the newly written function has the same name as the corresponding function in C#. In an alternative embodiment, the newly written function has a different name than the corresponding function in C#. The intersection library 650 and the portable library 652 are provided to the compiler and linker 648 so that the routines that are called from the developer's code can be found during the compilation and linkage phase.

The enterprise object code 654 is platform specific so that the enterprise object code 654 can be run on the customer's computer network 513 (FIG. 5). Further, as illustrated in FIG. 6, the enterprise object code 654 is provided to a packaging system 656, which adds additional information to the enterprise object code 654 to generate the enterprise module A 351. Accordingly, the enterprise module A 351 can now be utilized for the specific platform at the customer site 310 and can also be seamlessly integrated with other software at the customer site 310.

Some of the platform dependent artifacts 632 are provided after the compiling and linking phase. For instance, metadata may be provided to the compiler and linker 648, the enterprise object code 654, and the packaging system 656. The metadata can include information specific to the customer's platform. Accordingly, the metadata can help compile, link, and package the code for the enterprise module A 351 so that the enterprise module A 351 can run on the customer's native platform. Further, the metadata can be provided to the enterprise module A 351 at run time so that the enterprise module A 351 can execute according to customer specific information.

In addition, the deployment descriptors 638, XSD 640, WSDL 642, Bytecode 644, and Intl' resources 646 can also be added to the enterprise object code 654 and to the packaging system 656. These additional platform dependent artifacts may provide additional information and/or code that assists the enterprise module A 351.

Figure 7:
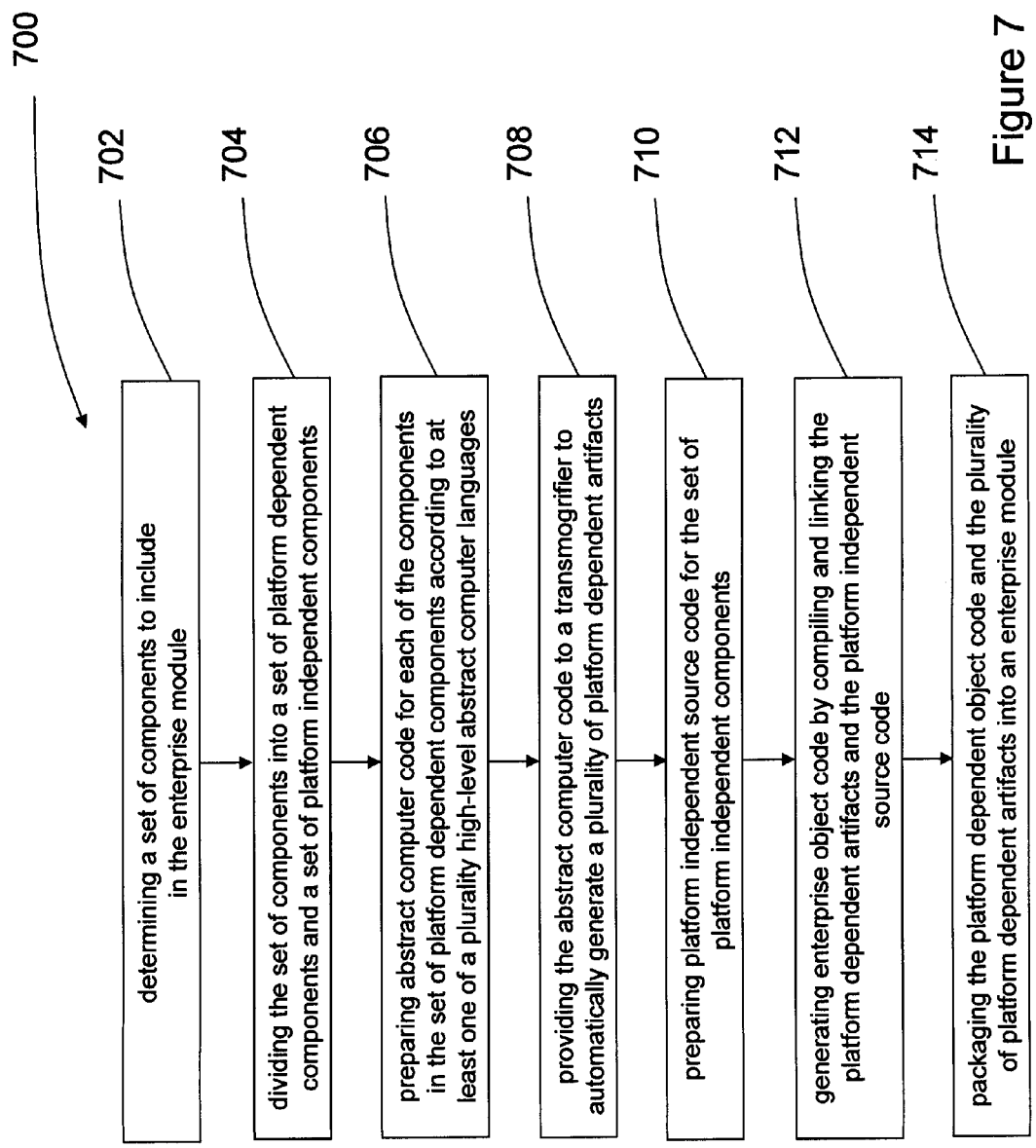
FIG. 7 illustrates a process in which the enterprise module can be generated.

FIG. 7 illustrates a process 700 in which the enterprise module A 351 can be generated. At a process block 702, a set of components to be included in the enterprise module A 351 is determined. Further, at a process block 704, the set of components is divided into a set of platform dependent components and a set of platform independent components. In addition, at a process block 706, abstract computer code is prepared for each of the components in the set of platform dependent components according to at least one of a plurality of high-level abstract computer languages. At a process block 708, the abstract computer code is provided to a transmogrifier to automatically generate a plurality of platform dependent artifacts. The plurality of platform dependent artifacts can include platform dependent source code, metadata, deployment descriptors, XSD, WSDL, Bytecode, and Intl' resources. Further, at a process block 710, platform independent source code is prepared for the set of platform independent components. In addition, at a process block 712, enterprise object code is generated by compiling and linking the platform independent source code and at least a subset of a plurality of platform dependent artifacts. For instance, the subset of the plurality of platform dependent artifacts can include the platform dependent source code. Finally, at a process block 714, the platform dependent object code and the plurality of platform dependent artifacts are packaged into an enterprise module.

Enterprise Module Dependencies

The discussion above explains how an individual enterprise module A 351 is generated so that the enterprise module can be easily integrated with the additional application 341 at the customer's site 310, as seen in FIG. 3. In one embodiment, the enterprise module A 351 can work in concert with the other enterprise modules to optimize efficiency. Accordingly, dependency relationships can be established between the enterprise modules.

As seen in FIG. 6, the intersection library 650 and the portable library 652 provide pre-constructed code that can be utilized for the enterprise module A 351. Further, the intersection library 650 and the portable library 652 can provide routines for either or both of the plurality of the platform dependent artifacts 632 and the platform independent source code 602. In one embodiment, all of the pre-constructed code that is utilized by the enterprise module A 351 does not have to be stored in the libraries for the enterprise module A 351. For instance, if the enterprise module B 352 utilizes similar pre-constructed code to the enterprise module A 351, the pre-constructed code can be stored in a library for the enterprise module B 352. The enterprise module A 351 can then access the pre-constructed code by depending on the enterprise module B 352. Accordingly, the enterprise module A 351 does not have to inefficiently repeat storage of the same pre-constructed code. Further, the pre-constructed code can be stored by the enterprise module B 352 even if the enterprise module B 352 does not actually need to utilize that pre-constructed code. For instance, if the enterprise module A 351 needs to utilize a large amount of pre-constructed code and the enterprise module B 352 only needs to utilize a small amount of pre-constructed code, the enterprise module B 352 has extra capacity and can thereby store some of the pre-constructed code that the enterprise module A needs to utilize.

Figure 8:
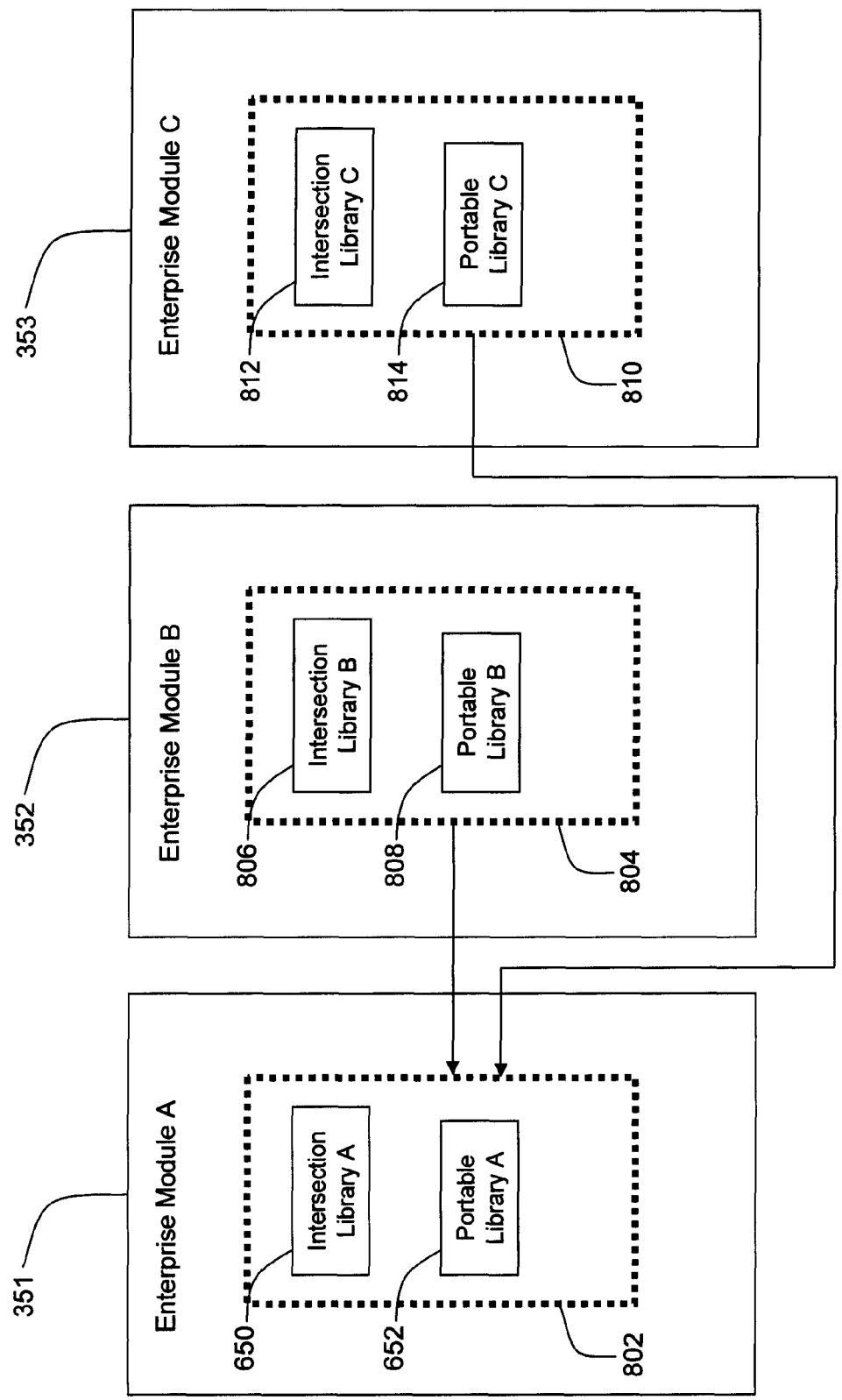
FIG. 8 illustrates enterprise module dependencies.

FIG. 8 illustrates enterprise module dependencies. A library collection 802 from the enterprise module A 351 depends on code from a library collection 804 from the enterprise module B 352 and a library collection 810 from the enterprise module C 353. The library collection 802 includes the intersection library A 650 and the portable library A 652. Further, the library collection 804 includes an intersection library B 806 and a portable library B 808. In addition, the library collection 810 includes an intersection library C 812 and a portable library C 814.

In the example of the pre-constructed function "reorient" discussed above, the enterprise module A 351 may wish to utilize the function "reorient," but may not actually have the code stored in the library collection 802. Further, in order for the enterprise module A 351 to be portable, the code it utilizes has to be able to be run on multiple platforms. For instance, the code that supports "reorient" in the .Net platform may be found in the library collection 804 of the enterprise module B 352 while the code that supports "reorient" in the J2EE platform may be found in the library collection 810 of the enterprise module C 353.

As will be discussed further, the code in the enterprise module A 351 may include libraries and/or executables. In one embodiment, a dependency declaration is provided at the level of the library or executable. Tags can be used to indicate the dependencies. For instance, a "<platformDepend>" tag can be utilized to indicate a dependency relationship. In the context of FIG. 8, the following code is provided as an example to illustrate the dependency of the portable library A 652 of the enterprise module A 351 to the portable library 808 of the enterprise module B 352 and the portable library 814 of the enterprise module C 353.

```
<libraries>
    <library name="portablelibraryA">
        <platform name="java" >
            <platformDepend module="B" component="library"
            name="portablelibraryB" />
            <code language="java" includes="**/*.java" />
        </platform>
        <platform name="dotnet">
            <platformDepend module="C" component="library"
            name="portablelibraryC" />
            <code language="java" includes="**/*.java" />
        </platform>
    </library>
```

When the portable library A 652 of the enterprise module A 351 is compiled on a Java platform, the portable library A 652 will have a dependency to the portable library B 804 of the enterprise module B 352. On the other hand, when the portable library A 652 of the enterprise module A 351 is compiled on a .Net platform, the portable library A 652 will have a dependency to the portable library C 814 of the enterprise module C 353.

In another embodiment, the portable library A 652 of the enterprise module A 351 may be able to rely on at least a portion of its own code, thereby allowing the portable library A 652 to rely less, or possibly not at all, on the portable library B 808 of the enterprise module B 352 and the portable library C 814 of the enterprise module C 353. Accordingly, an analysis is performed to determine what dependencies are needed or whether any dependencies are needed at all.

A portability tree can be constructed to determine what code is portable and what code is non-portable. Routines for the portable code can be placed in the platform independent source code 602 while routines for the non-portable code can be placed in the portable library 652. Since a subset of platform independent languages is utilized for the platform independent code, only one routine for a particular task is placed into the platform independent source code 602. On the other hand, multiple routines for the same task may need to be placed into the portable library 652 to ensure that the same task can be performed by platform dependent code on any of the intended platforms at the customer site 310, as seen in FIG. 3.

Figure 9:
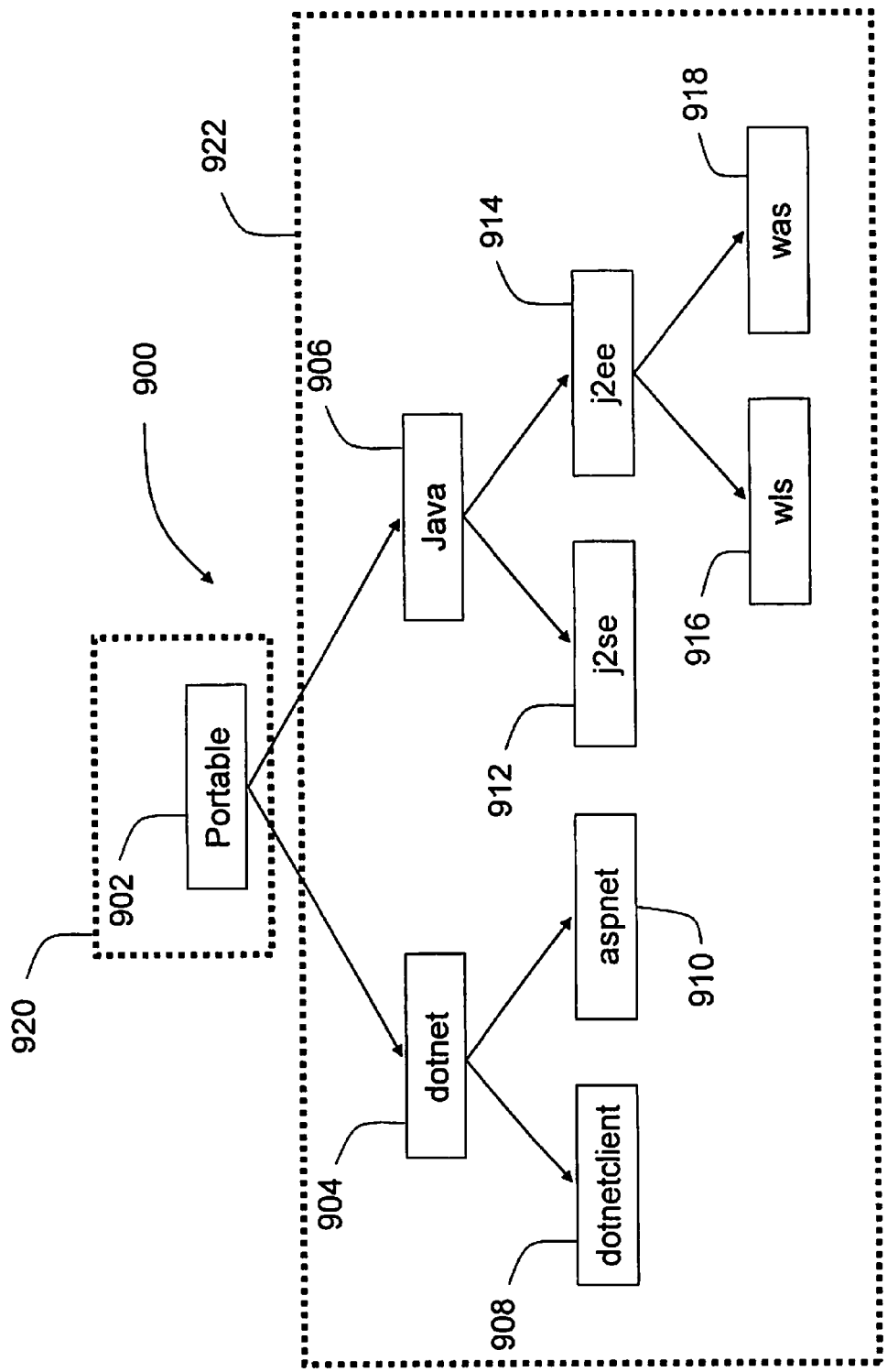
FIG. 9 illustrates a portability tree that can be utilized to classify a set of code as portable and another set of code as non-portable.

FIG. 9 illustrates a portability tree 900 that can be utilized to classify a set of code as portable and another set of code as non-portable. The portability tree 900, as seen in FIG. 9, depicts an example of a plurality of platforms and the relative level of portability for each of those platforms. A portable region 920 of the portability tree 900 indicates code that can run on a portable platform, thereby being platform independent. Further, a non-portable region 922 of the portability tree 900 indicates code that needs to run on a non-portable platform, thereby being capable of being compiled with code from the portable library 652. The leaflets of the portability tree 900 are placeholders for code in actual platforms where as any of the nodes above the leaflets are placeholders for code in virtual platforms. Through a downward propagation of the portability tree 800, the virtual platforms map to leaflets that hold code for actual platforms.

The root of the portability tree 900 is the most portable virtual platform where as the leaflets are the most specific and non-portable. For instance, if the code included in the enterprise module A 351 is written according to a portable node 902, the code can be utilized on any of the intended actual platforms for which the leaflets store code. At the next level of the portability tree 900, the code in the enterprise module A 351 is written in code for either the .Net 904 node or the Java node 906. If the code is written for the .Net 904 node, then the code may not be compatible with the Java node 906, and vice versa. At the next level of the portability tree 900, the code in the enterprise module A 351 is written for the dotnet client node 908, the aspnet node 910, the j2se node 912, or the j2ee node 914. Code written in the dotnet client node 908 or the aspnet node 910 is compatible with the .Net node 904. Further, code written in the j2se node 912 or j2ee node 914 is compatible with Java 906. At the next level of the portability tree 900, the code in the enterprise module A 351 is written for the wls node 916 or the was node 918. Further, code written for the wls node 916 or the was node 918 is compatible with j2ee node 914. One of ordinary skill in the art will be familiar with these different platforms. Accordingly, the portability tree 900 can be utilized to classify the different pieces of code in the enterprise module A 351.

For instance, after performing a portability tree 900 analysis on the code of the enterprise module A 351, it may be determined that the enterprise module A 351 has a library and/or executable with code written and/or generated at the portable node 902, code written and/or generated for .Net 904, and code written and/or generated for the was node 918. With respect to the code for the portable node 902, the enterprise module A 351 can run this code on any platform. During a build, code can be generated for each of the platforms in the leaflet nodes. Accordingly, a downward propagation can be performed to build code for each of the platforms at a lower level. A downward propagation is intended to mean a traverse down to the leaflets of a position in the portability tree 900.

With respect to the code for .Net node 904, the enterprise module A 351 can run this code on any .Net platform. Further, a downward propagation can be utilized to generate code on any of the platforms that are leaflets from the .Net node 904, e.g., the dotnet client node 908 and the aspnet node 910. However, this code cannot be run on any of the leaflet nodes of the Java node 906, e.g., the j2se node 912 or the j2ee node 914, or any of the leaflets from the j2ee node 914, e.g., the wls node 916 or the was node 918. The code at the leaflet nodes needs to be compiled with the intersection library 650 and the portable library 652 to ensure that the platform specific routines needed by the platform dependent code is available.

Figure 10:
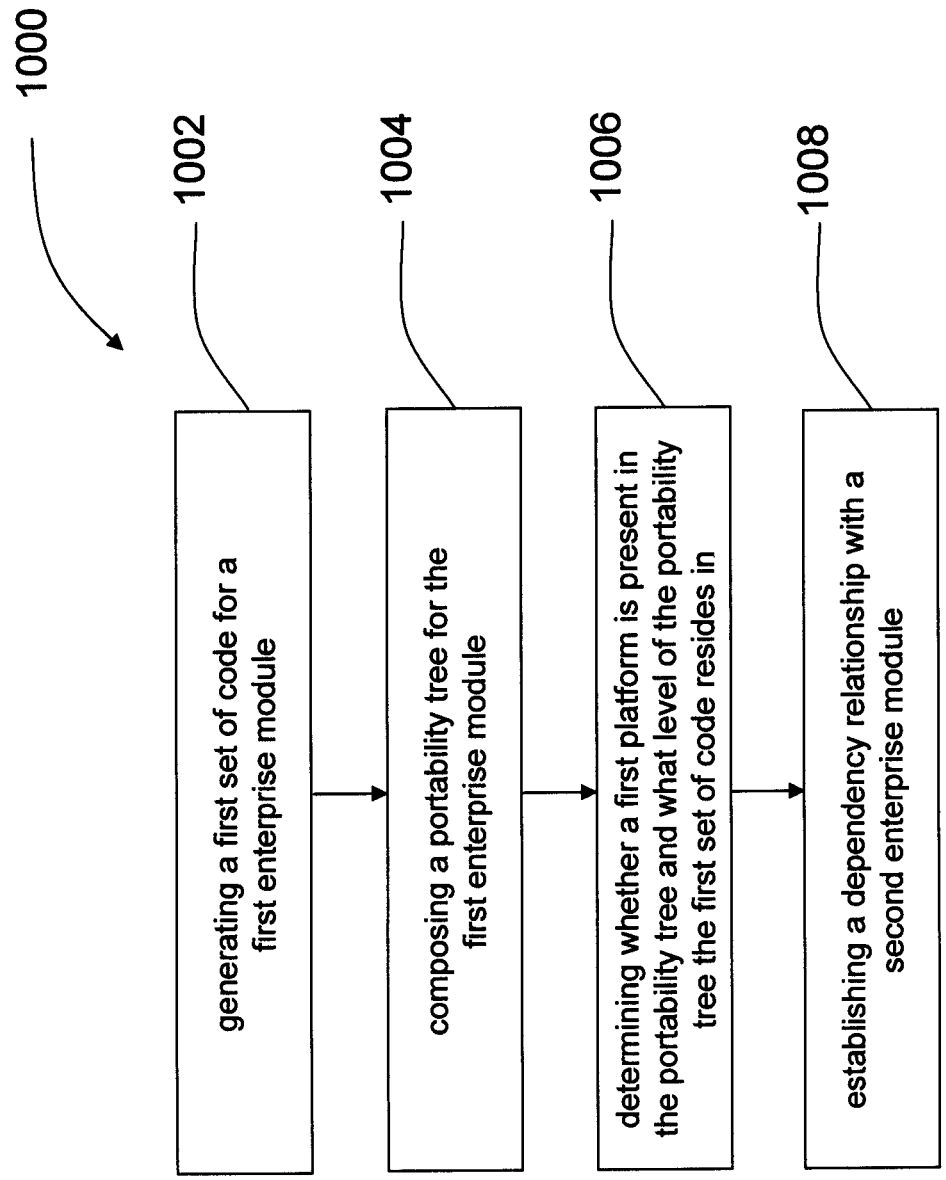
FIG. 10 illustrates a process for creating a portable enterprise module.

FIG. 10 illustrates a process 1000 for creating a portable enterprise module. At a process block 1002, the process 1000 generates a first set of code for a first enterprise module. The first set of code is designed to run on a first platform. At a next process block 1004, the process 1000 composes a portability tree for the first enterprise module. The portability tree includes a plurality of levels. The plurality of levels include a root level, a first sub-level, and a second sub-level. The root level includes a portable platform. Further, the first sub-level includes a plurality of first sub-level non-portable platforms. In addition, the second sub-level includes a plurality of second sub-level non-portable platforms. At a next process block 1006, the process 1000 determines whether the first platform is present in the portability tree and what level of the portability tree the first set of code resides in. Finally, at a process block 1008, the process 1000 establishes a dependency relationship with a second enterprise module, distinct from the first enterprise module, if the platform resides in the first sub-level or the second sub-level.

The portability tree 900, as seen in FIG. 9, is not limited in the number of levels that the portability tree 900 can utilize. In other words, the portability tree 900 can have many sub-levels. Further, any of the sub-levels can be utilized as the first sub-level or the second sub-level, as long as the root level is not utilized and the second sub-level is below the first sub-level. For instance, the first sub-level does not necessarily have to be the level below the root level. Further, the second sub-level does not have to be the last level. In addition, there can be levels in between the first sub-level and the second sub-level. Accordingly, a platform on the first sub-level is compatible with a platform on the second sub-level, thereby allowing for downward propagation. However, it is not necessarily the case that a platform on the second sub-level is compatible with a platform on the first sub-level, thereby preventing upward propagation. Therefore, supplementation is needed for the platforms included in the upward propagation. Further, supplementation is needed for the platforms in between the first sub-level platform and the second sub-level platform.

Figure 11:
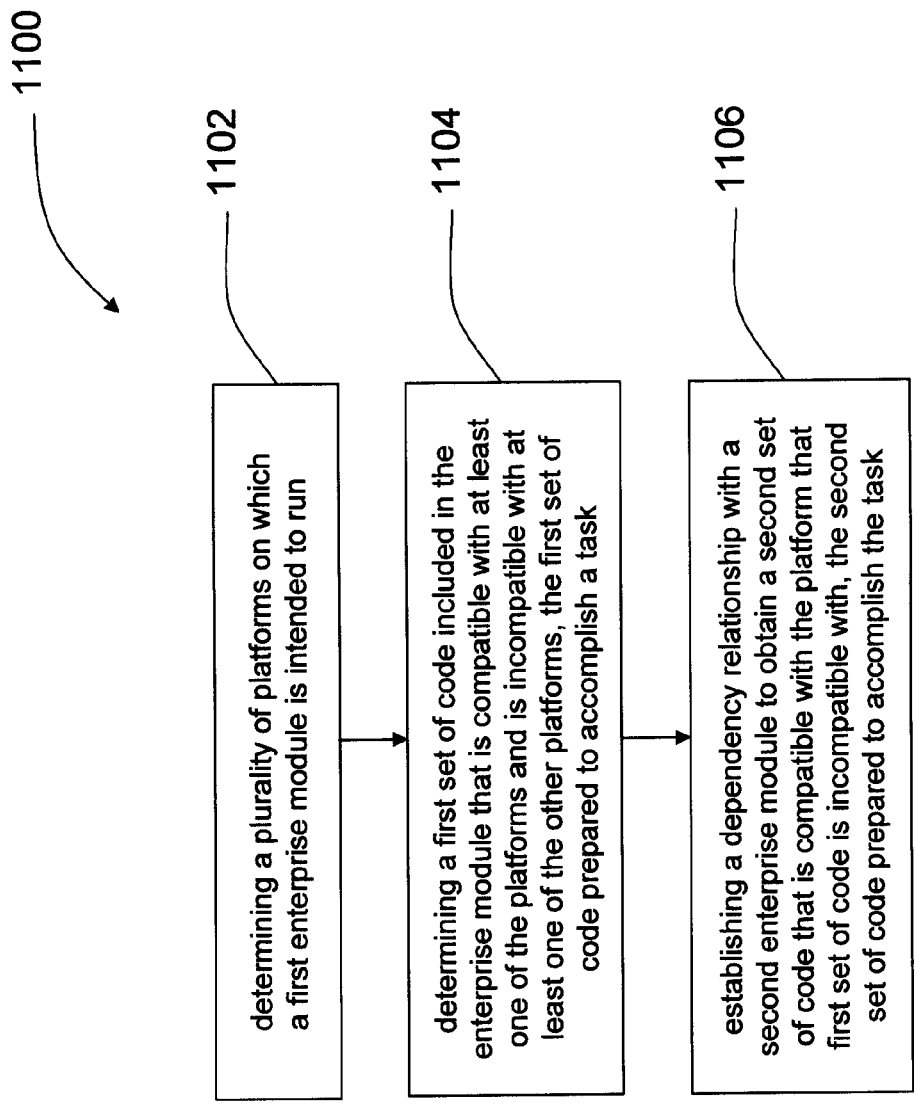
FIG. 11 illustrates a process of generating a portable enterprise module.

In one embodiment, dependency relationships can be established without utilizing the portability tree 900. FIG. 11 illustrates a process 1100 of generating a portable enterprise module. At a process block 1102, the process 1100 determines a plurality of platforms on which a first enterprise module is intended to run. Further, at a process block 1104, the process 1100 determines a first set of code included in the enterprise module that is compatible with at least one of the platforms and is incompatible with at least one of the other platforms. The first set of code is prepared to accomplish a task. In addition, at a process block 1106, the process 1100 establishes a dependency relationship with a second enterprise module to obtain a second set of code that is compatible with the platform that the first set of code is incompatible with. The second set of code is prepared to accomplish the task.

In order to help facilitate the type of platform that a particular library is associated with, a declaration can be provided for each executable and/or library to indicate the type of platform that the executable and/or library can run on. Accordingly, an analysis to determine the need for dependency relationships can be performed on the platform declaration of the code in the enterprise module A 351 to determine what platforms are present and what platforms are missing. Further, an analysis can be performed on the platform declarations of the code in the other enterprise modules to determine if other enterprise modules have code for the missing platform, thereby facilitating the identification of enterprise modules to which dependency relationships can be created. In one embodiment, a declaration file can be written to describe the enterprise module. Accordingly, the declaration file can be placed into the subdirectory for the enterprise module. The declaration file can begin with a <libraries> tag to indicate which library is being referred to, e.g., the intersection library 650 or the portable library 652. Further, a <platform name> tag can be provided to indicate what platform the library supports. In addition, a <code language> tag can be utilized to tell the system what computer language to utilize to build the source files. The following code is illustrative of a declaration file:

```
<libraries>
    <library name="PortableLibraryA">
        <platform name="java" supported="false" />
        <platform name="dotnet">
            <code language="java" includes="**/*.java" />
        </platform>
    </library>
    <library name="IntersectionLibraryA">
        <platform name="dotnet" supported="false" />
        <platform name="java">
            <code language="java" includes="**/*.java" />
        </platform>
    </library>
</libraries>
```

As an example, with respect to the Portable Library A, the code above indicates that the build system is to look under the "dotnet" subdirectory and search for all the files with the ".java extension. An "excludes" attribute can be utilized to exclude certain files. For example, the following code will find all of the .java files except for bad.java: <code language="java" includes="**/*.java" excludes="/bad.java"/>. Further, multiple types of platforms can be designated. For instance, the following code utilizes multiple masks: <code language="java" includes="/*.java,**/*.jsl"/>. Accordingly, the build system will find all the files with the .java and .jsl extensions. In addition, a tag can indicate what platforms are not supported. For instance, the following code provided in the above example indicates that Portable Library A should not be built on a java platform: <platform name="java" supported="false"/>.

In one embodiment, a code propagation policy can ensure that if a declared platform is unsupported, all of its descendents are also unsupported. In another embodiment, this aspect of the code propagation policy can be overwritten by specifically declaring the descendent platform.

In another embodiment, dependency relationships are created to avoid circular dependency relationships. In other words, a first enterprise module does not have a dependency relationship, direct or indirect, to a second enterprise module that has a dependency relationship, direct or indirect, to the first enterprise module. A circular dependency relationship can potentially lead to a situation in which two enterprise modules are depending on one another for code without either of the enterprise modules actually having the code.

By establishing dependency relationships at the enterprise module level, the complexity of maintaining the dependency relationships is significantly reduced. In other words, the dependency relationships do not have to be tracked at the file level or at the library level. For instance, when packaging an enterprise module, the other enterprise modules from which it depends can be easily deduced by performing a recursive walk through the dependency declarations of each enterprise module. As a result, a list of dependency relationships can be compiled.

In yet another embodiment, an enterprise module can include a library, executable, repository, and/or a module interface. The library can include a collection of classes working together. Further, the executable provides an entry point for execution. In addition, the repository provides a collection of configuration files. For instance, the repository can contain XML files describing object types and object definitions. A dependency relationship between repositories of two enterprise modules essentially creates a dependency relationship between the two enterprise modules. Further, the module interface exposes a set of interfaces that can be utilized by other enterprise modules.

Examples are now provided for different module interfaces. The module interfaces can include strings, exceptions, XSD-based types, web service proxy, web service skeleton, and configuration. Further, these different module interfaces can include generated code. Strings are classes that help manage string resources. Further, Exceptions are classes generated based on an exception message and group which a particular exception belongs to. In addition, XSD-based types are classes or types described by XML Schema. The XSD-based types provide the ability to serialize to streams and files. Further, the XSD-based types allows the association of the generated type to a subclass instead of the basic generated class skeleton. As a result, the developer can permanently augment a generated base class without losing added functionality each time a class is regenerated. In addition, a Web service proxy is a strongly typed proxy class for accessing a web service. The generated proxy classes are portable so that they can be utilized for all of the intended platforms. Accordingly, separate versions of the proxy are not needed for the different platforms. Further, a web service skeleton class provides the infrastructure needed for a web service. In addition, a configuration type provides a framework to work with a set of name-value pairs of configuration information.

In one embodiment, the code for an enterprise module can be provided in a subdirectory. For instance, the code in a system can be partitioned into code for applications, build system, core, and other categories. Further, each of these subdirectories can have more partitions that can be utilized to logically group and organize the code base. Accordingly, a subdirectory can be allocated for the enterprise module. The subdirectory can be identified by the presence of a module declaration file that defines the contents of the enterprise module and declares the relationship dependencies of the enterprise module. For instance, the module declaration file can be denoted as "module.dcl."

Conventions can be utilized for the structure of the subdirectories under the module subdirectory. One convention may be that the enterprise module's subdirectory should have the same name as the enterprise module's name. For instance, the enterprise module build-system may have a subdirectory build-system in which the module.dcl file is located. Another convention can be that, for each library and executable in the enterprise module, a subdirectory is created under the enterprise module directory with the same name as that of the library or executable. For instance, the library buildgen in the build-system enterprise module may have its code stored under the subdirectory build-system\buildgen. Yet another convention can be that, under each library or executable, a subdirectory is created for each platform that holds the code for the library. For instance, the buildgen library may have code whose portability category is portable. The code for the portable platform can be stored in build-system\buildgen\portable. Another convention involves creating package subdirectories once the correct platform subdirectory is created. The package subdirectories can follow the convention utilized by Java so that each subdirectory corresponds to a part in the package name separated by the "." character.

The actual build process for an enterprise module shall now be described. A first build file generation process has two main phases. The first phase iterates through a list of subdirectory locations and recursively scans for module.dcl files. When an instance of the module.dcl file is found, the location of the where the module.dcl file is found gets recorded as the location of the enterprise module described in the module.dcl file. The collection of these enterprise modules makes up all the enterprise modules that the build system knows about until the first build file generation process is run again. In the second phase, each module.dcl file is serialized into memory and processed further. The dependency relationships declared in each enterprise module, as well as information about the libraries and executables that will eventually be generated or built, are recorded in a properties file. Further, a collection of build.xml files can be generated. The build.xml files contain instructions to invoke the proper tools to generate, compile, and package the libraries and executables that make up an enterprise module. A module.dcl file is generated for each enterprise module in its location, alongside the module.dcl file. An additional build file can be generated at a root location. The build file at the root location is the main build file that will call the individual build files. This allows a single invocation .xml build files to build all the modules detected by the build file generation process.

A second build file generation process is code generation and compilation. If the second build file generation process is invoked at the root location, where the main build file is generated, then the main build file simply traverses through a list of build files that make up all the enterprise modules and builds each one as the main build file goes through the list. At the end of the traverse, all the enterprise modules known to the build system are built. If the second build file generation process is invoked at one of the enterprise module's locations, then that particular enterprise module and all of its dependencies are built. For example, if an enterprise module has a dependency on the infrastructure enterprise module, for example, then building the enterprise module will also build the infrastructure enterprise module. Therefore, a developer does not need to be concerned about the sequence of the build in that a prerequisite library may not have been built yet. As each enterprise module is built, all of its dependencies are built. This is based on the assumption that the enterprise module is properly declared in the module.dcl file.

The code generation will invoke a code generator to generate the source files implementing the declared items for the enterprise module. The platform that is utilized for generating the source code is determined by how the declared item is declared in the module.dcl file.

The compilation involves feeding source code through the appropriate compiler to emit binary components. The binary components can take the form of a library or an executable. The form of the binary component is declared in the module.dcl file. For example, a JAR file can be built for a Java platform while an EXE or DLL file can be built for a .Net platform.

Deployment

The enterprise modules are designed so that there is the ability to support continuous change in the business logic, enterprise topology, or underlying technology. Accordingly, customers can avoid the painful downtime that is often seen when enterprise applications undergo a modification or update. In addition, dependency relationships are updated if there is a modification or update.

The term "deployment" is intended to mean the support provided for a comprehensive enterprise application lifecycle. The support is provided for stages for requirements gathering, feature tracking, development, testing, staging, and production. Further, the support is also provided for multiple degrees of coupling and sovereignty including informal linkages between environments, partitioned groups of users in a single environment, and a flexible versioning system which reduces the effort and impact of change. A specific usage pattern for the deployment technologies shall be referred to as a deployment methodology.

Figure 12:
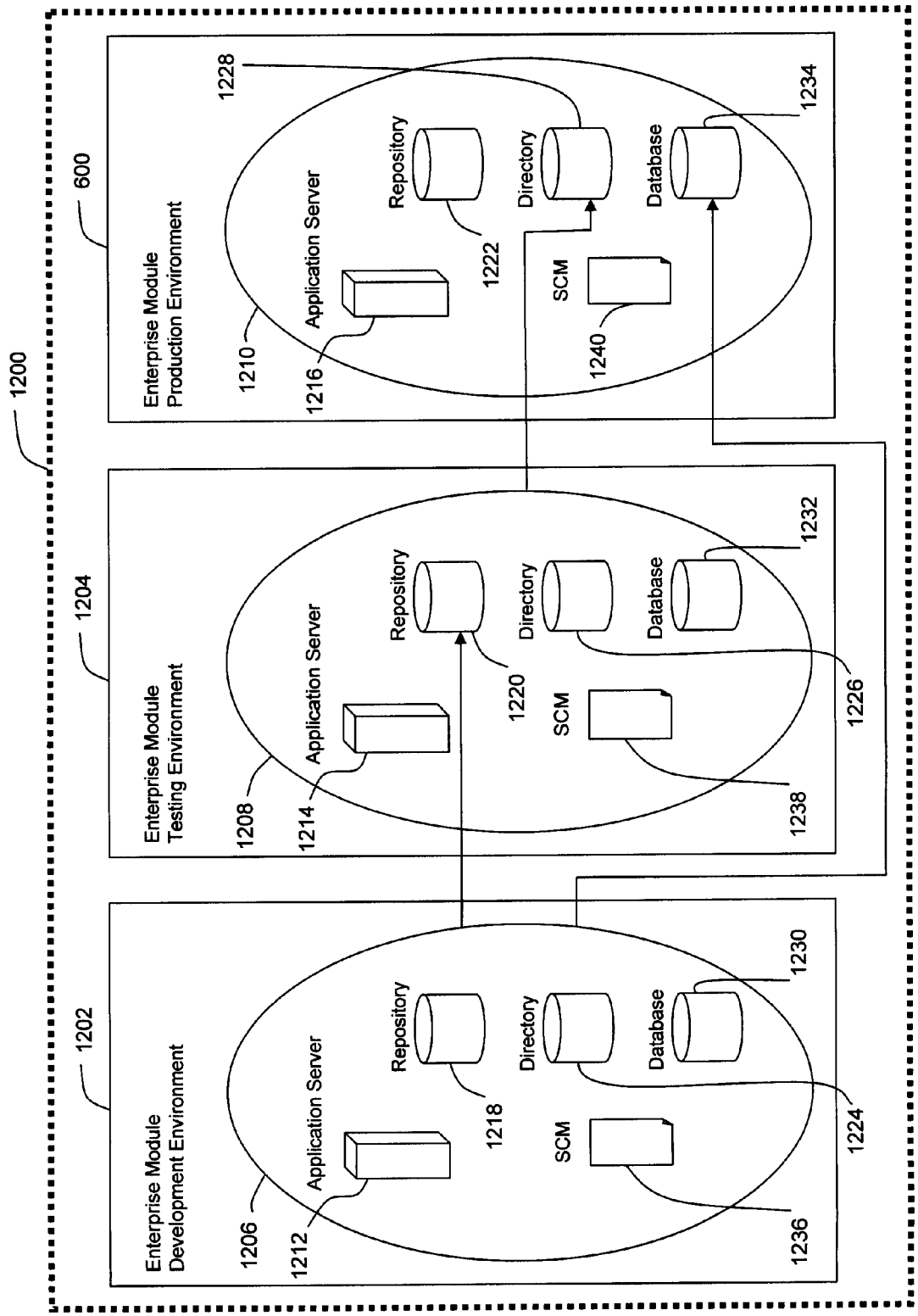
FIG. 12 illustrates a system that can be utilized to construct the plurality of enterprise modules.

FIG. 12 illustrates a system 1200 that can be utilized to construct the plurality of enterprise modules. The system 1200 includes a plurality of environments. The code for the enterprise modules can be developed through an enterprise module development environment 1202 and tested through an enterprise module testing environment 1204 prior to final production in the enterprise module production environment 600.

The enterprise module development environment 1202 includes resources 1206. Further, the resources 1206 include an application server 1212, a repository 1218, a directory 1224, and a database 1230. In one embodiment, a Software Configuration Management ("SCM") system 1236 can also be provided. The application server 1212 hosts the code that is being developed for the enterprise module. Further, the repository 1218 includes a metadata representation of the user interface, business logic, services, functionality and behavior of one or more enterprise applications. In addition, the directory 1224 can hold files for the code. Further, the database 1230 can hold additional data. A developer can utilize the enterprise module development environment 1202 to develop code. Further, the enterprise module development environment 1202 can share the resources 1206 with the enterprise module testing environment 1204 and the enterprise module production environment 600. For instance, as illustrated in FIG. 12, the enterprise module development environment 1202 shares the resources 1206 with the repository 1220 in the enterprise module testing environment 1204. Further, as illustrated in FIG. 12, the enterprise module development environment 1202 shares the resources 1206 with the database 1234 in the enterprise module production environment in the enterprise module production environment 600.

The enterprise module testing environment 1204 includes resources 1208. Further, the resources 1208 include an application server 1214, a repository 1220, a directory 1226, and a database 1232. In one embodiment, an SCM system 1238 can also be provided. The application server 1214 hosts the code that is being developed for the enterprise module. Further, the repository 1220 includes a metadata representation of the user interface, business logic, services, functionality and behavior of one or more enterprise applications. In addition, the directory 1226 can hold files for the code. Further, the database 1232 can hold additional data. A developer can utilize the enterprise module testing environment 1204 to test the code that was developed in the enterprise module development environment. Further, the enterprise module testing environment 1204 can share the resources 1208 with the enterprise module development environment 1202 and the enterprise module production environment 600. In addition, the enterprise module testing environment 1204 may utilize resources from another environment. For instance, as illustrated in FIG. 12, the enterprise module testing environment shares the resources 1208 with the directory 1228 in the enterprise module production environment 600.

The enterprise module production environment 600 includes resources 1210. Further, the resources 1210 include an application server 1216, a repository 1222, a directory 1228, and a database 1234. In one embodiment, an SCM system 1240 can also be provided. The application server 1216 hosts the code that is being developed for the enterprise module. Further, the repository 1222 includes a metadata representation of the user interface, business logic, services, functionality and behavior of one or more enterprise applications. In addition, the directory 1228 can hold files for the code. Further, the database 1234 can hold additional data. A developer can utilize the enterprise module production environment 600 to produce the code that was developed in the enterprise module development environment 1202 and tested in the enterprise module testing environment 1204. Further, the enterprise module production environment 600 may utilize resources from another environment.

Accordingly, a system is provided that includes a plurality of environments. A change to one of the environments is migrated to the other environments through an automated deployment process, without user interaction, to reduce the likelihood of creating a problem as a result of the migration. In other words, a modification to a piece of code in one environment may require multiple changes to code in a different environment. For example, a single logical change may encompass changes to the user-interface, compiled code, metadata, database schemas, third party applications, runtime parameters, seed data, operating system settings, application data, user and group definitions in a directory, message queue names, cryptographic key stores, business processes, office documents, image files, etc. The automated deployment process helps ensure that all of the necessary changes are made in the environment to which code is migrated because forgetting a change or making changes in the wrong order can result in a non-functional environment. In another embodiment, the deployment process can be implemented through user interaction without an automated process. In yet another embodiment, the deployment process can be implemented through a combination of an automated process and user interaction.

The automated deployment process can be implemented through an installer, packager, deployer, and artifacts. The installer is an executable responsible for offloading files which make up the enterprise modules and for configuring the packager and deployer applications to the point where the first business application could be deployed to an applications server. Further, the packager is an executable responsible for understanding the configuration of a workspace and creating releases based on that workspace. For example, the packager could be pointed at directories containing repository and code artifacts as input, and generate environment-agnostic packaged applications (releases) ready for the deployer. In other words, the packager can configure code for the different enterprise modules that will be part of a release. For example, in J2EE, "earfiles" would be generated. As a further example, in NET, "vdirs" would be generated. In addition, the packager can create related non-application server items like database schemas, system parameters, or directory entries for both J2EE and .Net. In addition, the deployer is an executable responsible for customizing, sequencing, and executing the deployment of a release into an environment. The deployer is responsible for creating a working application. Finally, the deployment automated process includes packaging artifacts, which are the output of the packager after the packager has herded all of the raw files and other source data into the correct locations. Once created, the packaging artifacts are modified by the deployer for the target environment and then deployed in the proper sequence.

The packager essentially creates a set of standard configuration information for the release, i.e., for the enterprise modules to be deployed. For instance, the packager can create standardized deployment descriptors for an enterprise module to run on J2EE or web.config and Metabase vdir settings for an enterprise module to run on .Net. However, the package will not likely be deployable to a target environment because the package has not been customized for the target environment. For instance, the package lacks needed information such as which database pool to utilize, what URLs the web services should live on, which application server particular deployment descriptors and settings should be applied to, etc. The deployer fills in this information.

Further, the packager can handle more constructs than application packages. For instance, the packaging may consist of metadata needed by a specific deployment function.

In addition, the packager can create a preliminary dependency set which includes dependencies that the repository knows about. The deployer can thereafter generate a final dependency set by merging the packager-generated dependencies with the deployer's knowledge of the target environment. The final dependency set can be utilized to determine the ordering of operations in a deployment script. For instance, a final dependency set may include a Service A depending on a Service B which depends on a Service C. Accordingly, the deployment order may be Service C, Service B, and Service A to ensure that Service C is present for Service B and Service A, and that Service B is present for Service A.

Figure 13:
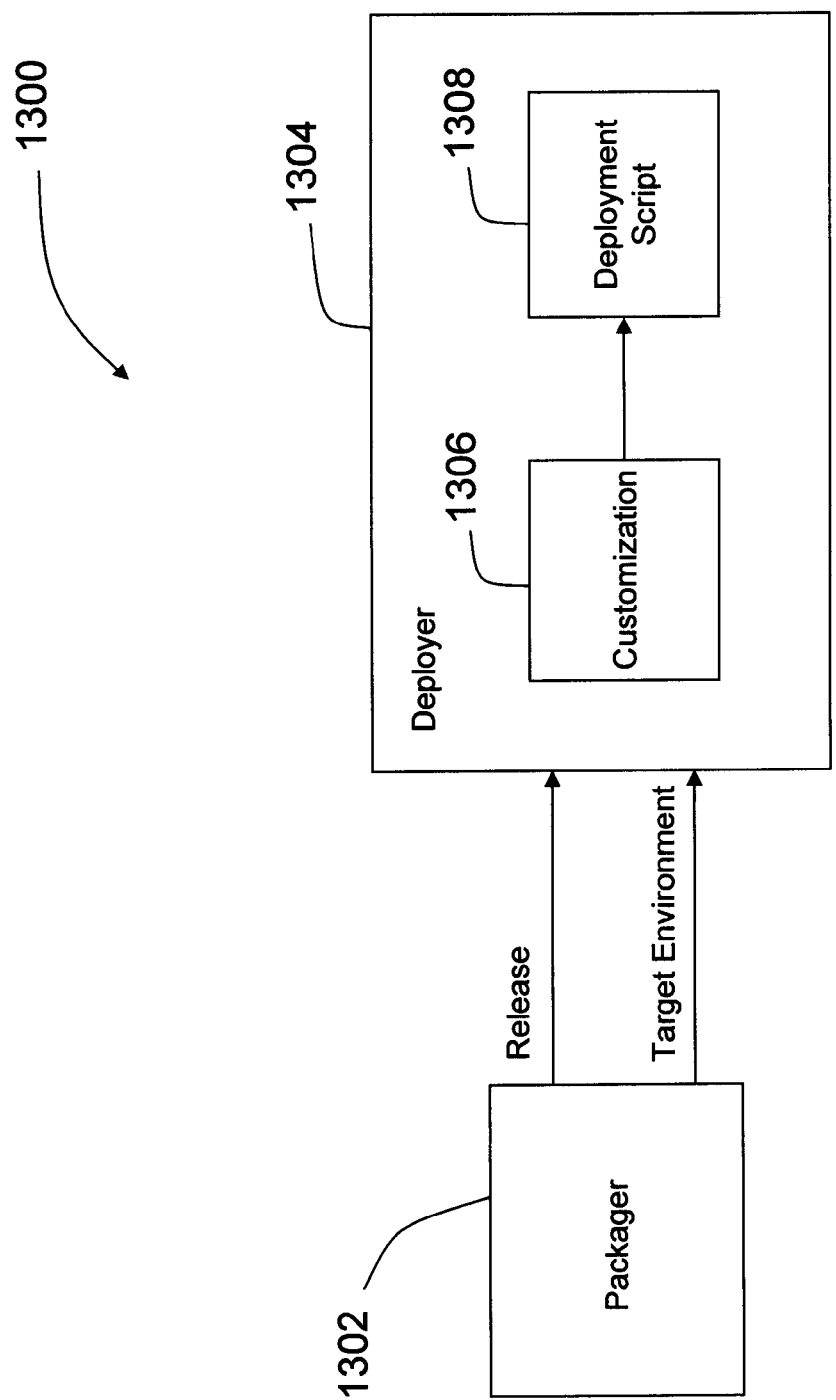
FIG. 13 illustrates a block diagram that depicts the interaction between a packager and a deployer.

FIG. 13 illustrates a block diagram of a system 1300 that depicts the interaction between a packager 1302 and a deployer 1304. In one embodiment, the deployer 1304 receives a release and a target environment as inputs. This is allows for a straight deployment. In an alternative embodiment, the deployer 1304 additionally receives a source environment. Inclusion of a source environment enables migration support capabilities.

The deployer 1304 may operate in two stages. In a first stage 1306, the packages are customized for the target environment, deployment dependencies are calculated, and a deployment script is generated. The deployment script contains the sequence of operations which will be performed in a second stage 1308. The deployer 1304 can copy everything from the packaging directory into a deployment directory so that the packaging directory can be reused for another deployment without re-running the packager.

In another embodiment, the deployer can be run in single-stage mode. This allows the opportunity to manually tweak both the customized packages and the deployment ordering.

Figure 14:
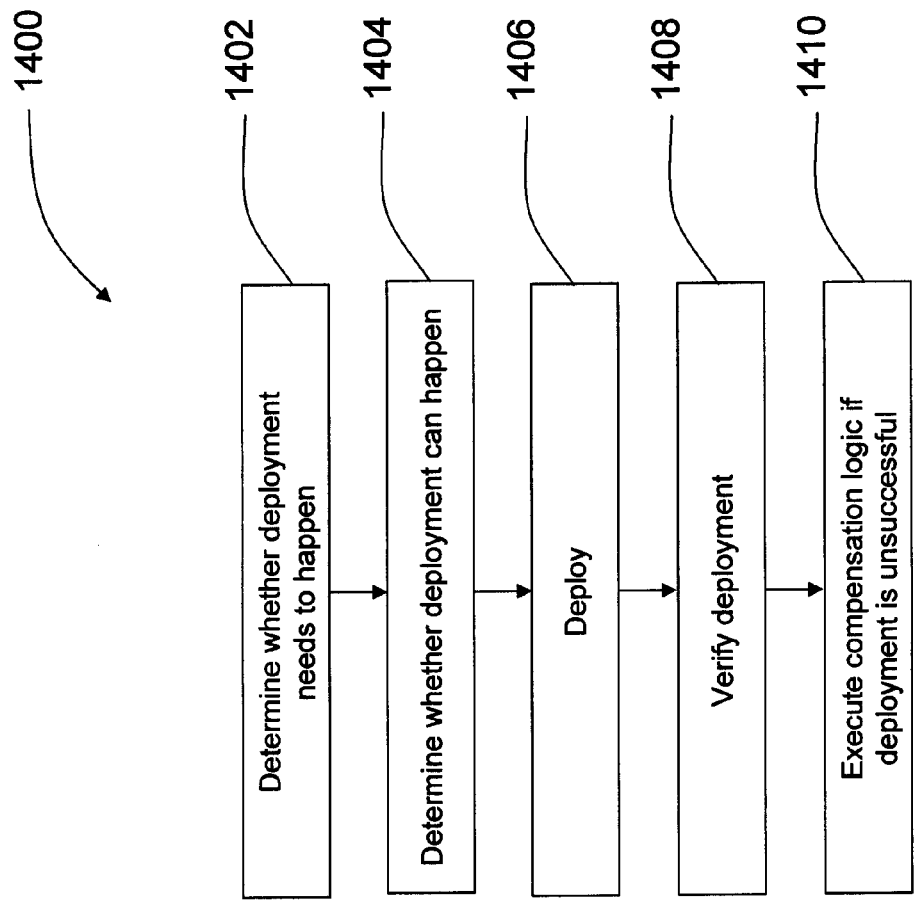
FIG. 14 illustrates a process that can be utilized for deployment.

FIG. 14 illustrates a process 1400 that can be utilized for deployment. At a process block 1402, the process 1400 determines whether deployment needs to happen. Further, at a process block 1404, the process 1400 determines if deployment can happen. In addition, at a process bock 1406, the process 1400 deploys. Further, at a process block 1408, the process 1400 verifies deployment. Finally, at a process block 1410, the process 1400 executes compensation logic if the deployment was unsuccessful.

As an example, a package may contain a schema for a database table. For instance, in the first stage, the deployer modifies the schema to add information indicating that the target environment is an Oracle environment, the owner of the database table is Scooby, Oracle-specific indexes need to be created, and optimized sql needs to be generated. In the second stage, the deployer connects to the database and reads the existing schema to determine if the table already exists and, if so, whether the existing schema is the correct schema. If the table needs to be created or updated, the deployer attempts to perform the modification while connected to the database and then verifies that the table now has the correct schema.

In one embodiment, the deployer matches artifacts with resources. Further, the deployer can match artifact/resource combinations to deployment functions. Further, for inter-environment deployments, the artifacts can also be processed by mapping functions. These mapping functions can also be utilized for straight deployments.

Many changes may be necessary to update an application to a new release. The packager and deployer collaborate to determine the ordering of changes. The ordering is determined so as to avoid or minimize application interruptions. In order to achieve this, the packager and deployer need to know about the types of changes which are possible and the effects of those changes on applications, as well as the dependencies among application components and the usage of underlying framework libraries.

A "change set" is the complete set of changes needed to move to a new state. The change set is encapsulated by a deployment script, which can be autogenerated by the packager and the deployer. In one embodiment, the deployment script is customized by the user. An individual change will be referred to as a "breaking change" or a "non-breaking change." Further, each individual change can be referred to as a "replacing change" or a "non-replacing change." These characteristics can be applied to changes to interfaces, behavior, metadata, code patches, etc. The deployer is aware of and provides support for the desired characteristics of each change in a change set.

A breaking change is a change that leads to an after state that is mutually exclusive with the before state. Accordingly, a transitional state cannot occur. For example, if a change set includes a database schema change introducing a new required field with no default, and a new service version which knows about the required field, then the old service cannot continue operations while the change set is being deployed, i.e., once the database change has been made).

A non-breaking change is a change where the before and after states are not mutually exclusive. Accordingly, a transitional state can occur. For example, a new optional field can be added to a table definition in a database schema without breaking anything above it.

A replacing change is a change that adds new material and renders the old material obsolete. For a non-breaking replacing change, the old material can exist while the new material is being deployed. The old material is removed as soon as possible after the new material has successfully deployed. For a breaking replacing change, the old material must be removed before the new material can be deployed.

Further, a non-replacing change is a change in which the new material and old material may peacefully co-exist indefinitely. The new material either augments or deprecates the old material. Deploying a non-replacing change indicates a preference, but not a requirement, that the new material is utilized instead of the old material. There are no breaking non-replacing changes, since it is not possible to have both versions simultaneously for a breaking change.

Interface changes are any changes which affect WSDL PortType elements, including changes to the names or signatures of operations and also changes to the schemas of input, output, and fault messages.

Non-breaking changes to interfaces are defined as any changes which can be made without causing clients built on previous versions of the WSDL to break. More specifically, any message instance valid per the old schema must also be valid in the new schema. Interface non-breaking changes can be replacing changes.

All other interface changes are breaking changes. Further, breaking changes to an interface can be disallowed. A requirement may exist for a new service to be created for the new interface instead, and the semantics of the deployment of the new service will be impacted by whether the implementation differences are breaking or non-breaking.

In addition, breaking changes to a service's implementation are defined as those which render the effects of a message received by the old implementation incompatible with those of the new implementation. For example, if data persisted by the new implementation were unusable by the old implementation or vice-versa.

Further, non-breaking changes are all other changes to an implementation, and may be replacing or non-replacing. Most configuration/metadata changes should be non-breaking replacing changes.

Internal API changes in general should not be visible to customers. One situation where internal API changes may be visible to customers is breaking changes, (especially in J2EE which lacks features like NET's "Strong Name" support) where the packaging options available may be influenced by system library version dependencies. For example if service X and service Y are released far apart in time, they may use underlying libraries which are incompatible. Both services may be used in an environment, but if the differing libraries are "shared," the services may not be grouped into a single J2EE application.

Figure 15:
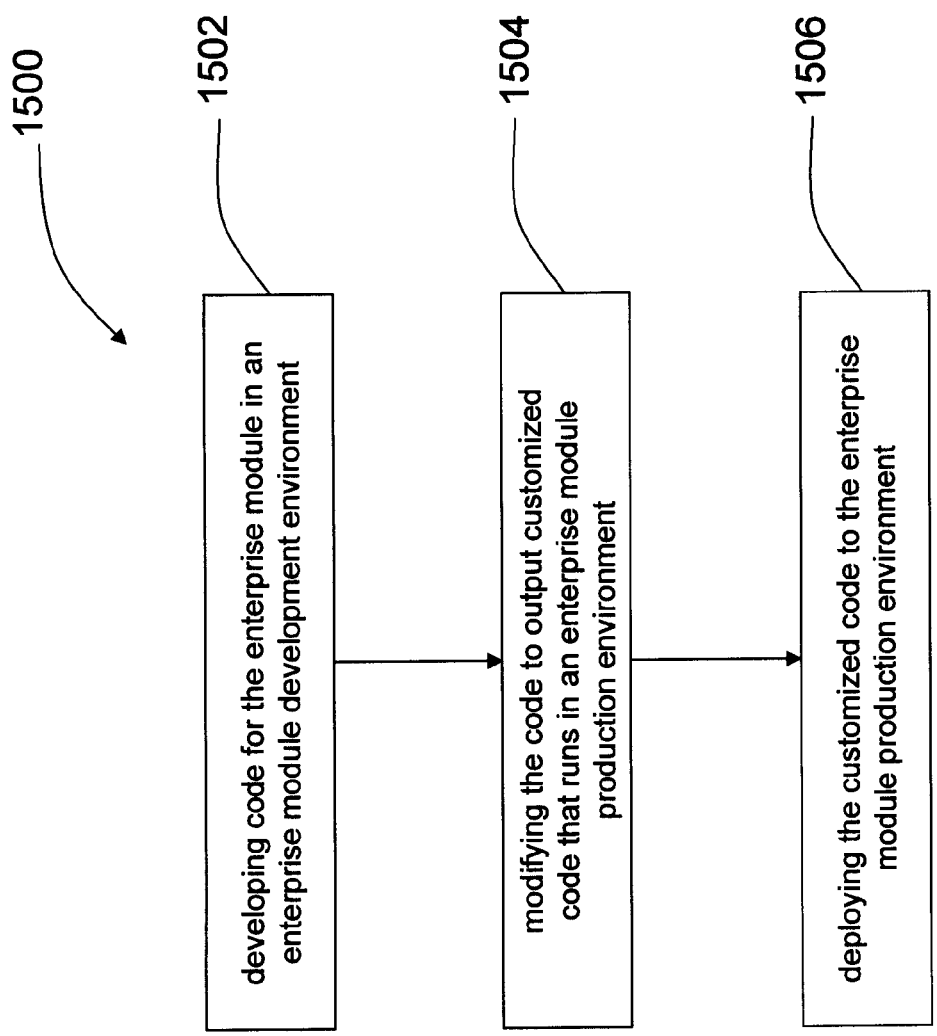
FIG. 15 illustrates a process for producing an enterprise module.

FIG. 15 illustrates a process 1500 for producing an enterprise module. At a process block 1502, the process 1500 develops code for the enterprise module in an enterprise module development environment. Further, at a process block 1504, the process 1500 modifies the code to output customized code that runs in an enterprise module production environment. In one embodiment, the modification is automatic, without any user interaction. In another embodiment, the modification is by user interaction. In yet another embodiment, the modification is by a combination of an automatic process and user interaction. In addition, at a process block 1506, the process 1500 deploys the customized code to the enterprise module production environment.

In one embodiment, the enterprise modules can be deployed as a group of modules. Further, the dependency relationships of each of the modules in the group are also deployed.

Continuous Deployment

In one embodiment, multiple versions of the same enterprise module can be deployed to an environment. The deployment of multiple versions of the same enterprise module, application, service, artifact, etc. is referred to as "continuous deployment." For example, a testing application in the enterprise module testing environment 1204, as illustrated in FIG. 12, may utilize a first version of an enterprise module. Further, a second version of the enterprise module may be deployed to the enterprise module testing environment 1204. Both the first version and the second version of the enterprise module can run simultaneously within the enterprise module testing environment 1204. For instance, a first user can utilize the first version at the same time as the second user utilizing the second version.

Figure 16:
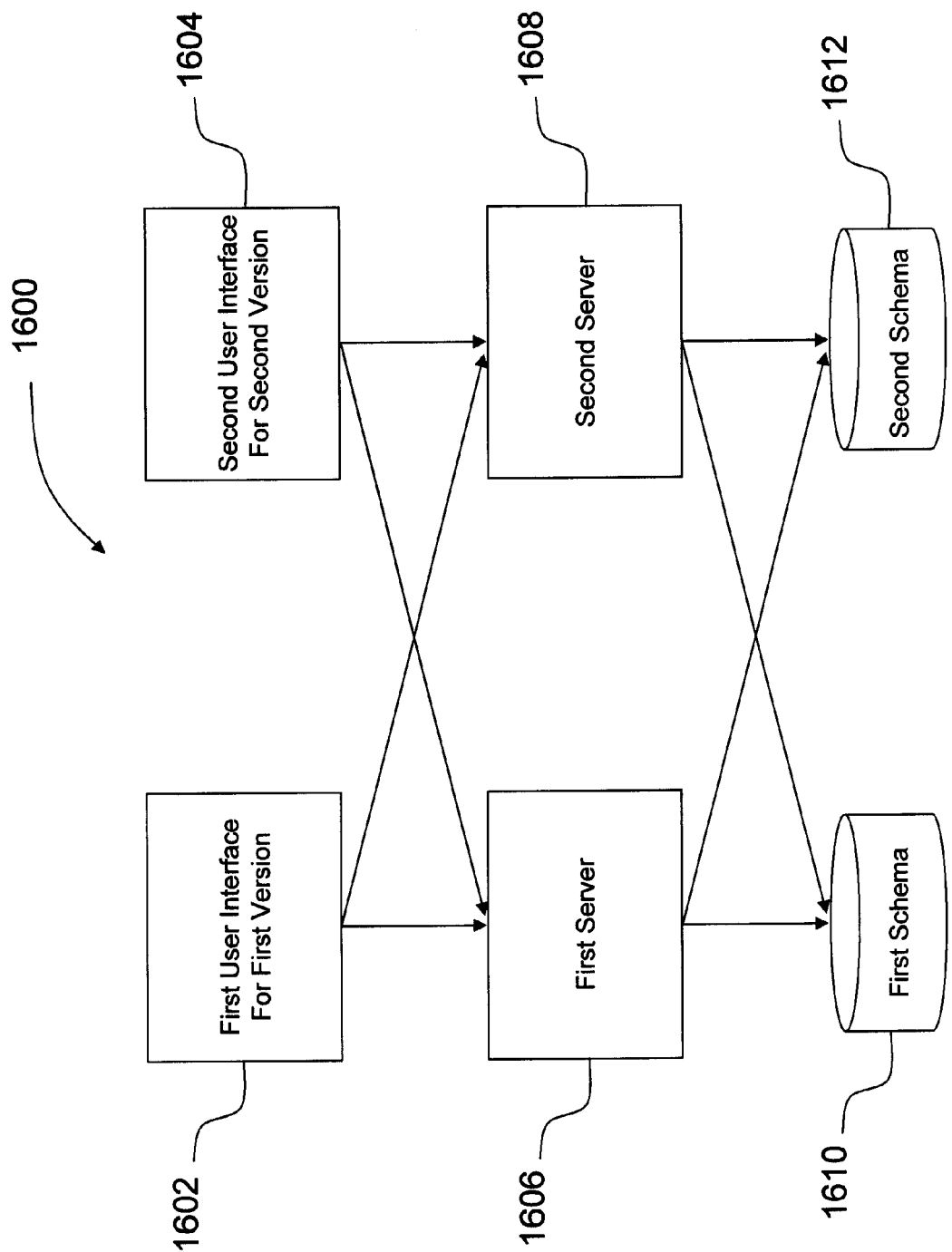
FIG. 16 illustrates a block diagram of a continuous deployment architecture 1600.

FIG. 16 illustrates a block diagram of a continuous deployment architecture 1600. A first user interface 1602 for the first version is utilized for a first user to interact with the first version. The first version can be stored on a first server 1606. In addition, a first schema 1610 for the first version can be stored in the first server 1606. Further, a second user interface 1604 for the second version is utilized for a second user to interact with the second version. The second version can be stored on a second server 1608. In addition, a second schema 1612 for the second version can be stored on the second server 1608. Accordingly, the first version can operate simultaneously with the second version in the same environment because the first version can operate on the first server 1606 and the second version can operate on the second server 1608.

The first user interface 1602 is given access to both the first server 1606 and the second server 1608. In one embodiment, the first version is stored on both the first server 1606 and the second server 1608 so that the first user interface 1602 can access the first version on either server. If the first version is to be replaced by the second version on the first server 1606, the first user can still access the first version on the second server 1608 through the first interface. Accordingly, the first user can access the first version without an interruption in service while there is an update.

Similarly, the second interface 1604 is given access to both the first server 1606 and the second server 1608. In one embodiment, the second version is stored on both the first server 1606 and the second server 1608 so that the second user interface 1602 can access the second version on either server.

The continuous deployment architecture 1600 supports continuous deployment of releases to a target environment by supporting multiple simultaneous versions of each artifact, including business services, business object, business rules, business events, and business process in the same environment. Accordingly, new users can be added without affecting existing users. Further, new applications can be installed without affecting currently running applications. In addition, new versions of an application can be installed without requiring all users to immediately move to a new version. Further, system administrators are given the opportunity to break up and schedule downtime.

Figure 17:
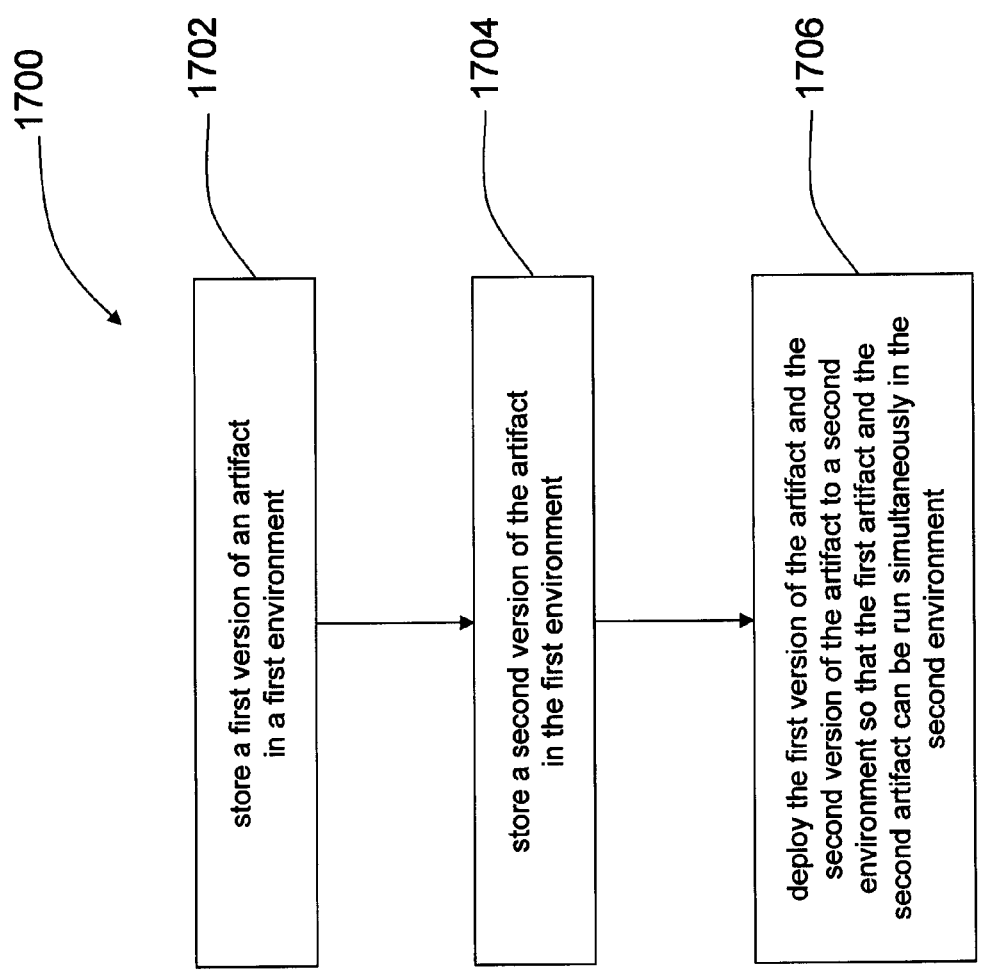
FIG. 17 illustrates a process of providing continuous deployment.

FIG. 17 illustrates a process 1700 of providing continuous deployment. At a process block 1702, the process 1700 stores a first version of an artifact in a first environment. Further, at a process block 1704, the process 1700 stores a second version of the artifact in the first environment. The second version of the artifact is distinct from the first version of the artifact. In addition, at a process block 1706, the process 1700 deploys the first version of the artifact and the second version of the artifact to a second environment so that the first artifact and the second artifact can be run simultaneously in the second environment. The second environment is distinct from the first environment.

In one embodiment, each artifact publishes public and stable APIs for each interface and only allows additive changes for future versions. If an interface needs significant change, an author writes compatibility code to ensure that the new interface supports the old published API.

As an example of allowing for the creation and installation of multiple releases in the same system, a single system can host a first release with an old pricing service and a second release with a new pricing service. The second release with the new pricing service has an interface that is compatible with an interface of the first release with the old pricing service. Further, end users can be bound to specific releases. For example, a system administrator can bind one set of users to the first release and another set of users to the second release.

Further, simultaneous access of multiple data sources is provided. Accordingly, application developers may try to avoid making a change to a schema that is compatible with a new version of an artifact, but incompatible with an old version of the artifact. If such a change is needed, both versions of the schema can be stored so that each version of the artifact can access the schema that is compatible for the version. Further, data can be migrated from the old version of the schema to the new version of the schema over time so that that a user can eventually transition to the new version of the artifact.

Having compatibility at the interface level for the services, data model, and business processes supports multiple releases in the same environment. Accordingly, a system administrator can install new versions of an artifact in an environment and enable the new versions without creating a risk for users utilizing the old version of the artifact. End users can be migrated from an old version of the artifact to a new version of the artifact over time. Further, the old version of an artifact can be removed from the environment after all the end users utilizing the old version have migrated to the new version of the artifact.

Figure 18:
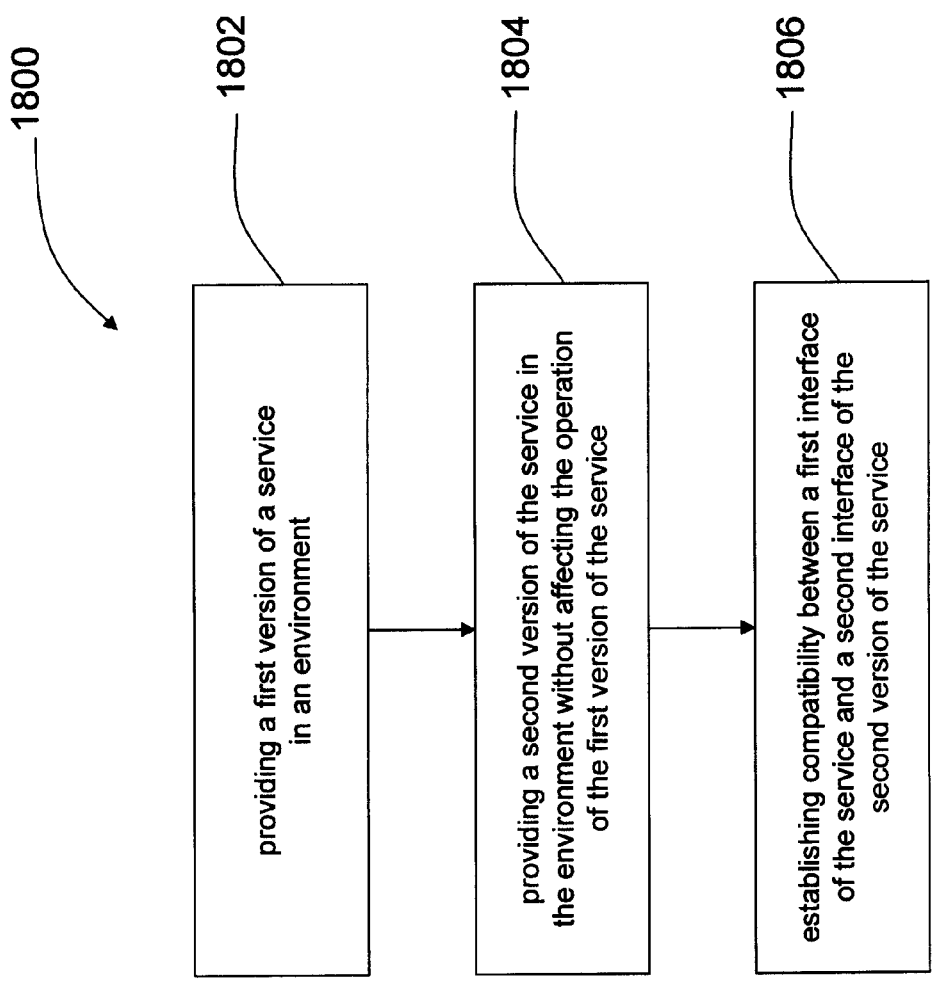
FIG. 18 illustrates a process of providing continuous deployment.

FIG. 18 illustrates a process 1800 of providing continuous deployment. At a process block 1802, the process 1800 provides a first version of an artifact in an environment. Further, at a process block 1804, the process 1800 provides a second version of the artifact in the environment simultaneously with the first version of the artifact. In addition, at a process block 1806, the process 1800 establishes compatibility between a first interface of the first version of the artifact and a second interface of the second version of the artifact.

Figure 19:
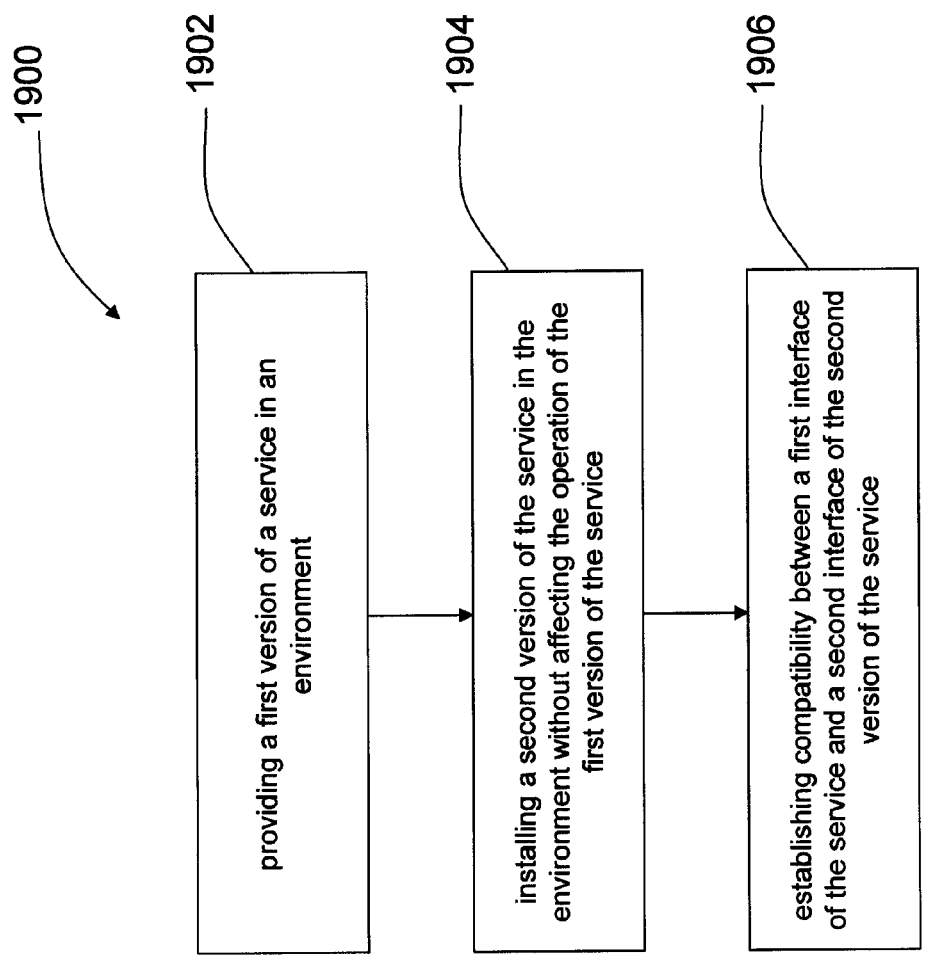
FIG. 19 illustrates a process of providing continuous deployment.

FIG. 19 illustrates a process 1900 of providing continuous deployment. At a process block 1902, the process 1900 provides a first version of a service in an environment. Further, at a process block 1904, the process 1900 installs a second version of the service in the environment without affecting the operation of the first version of the service. In addition, at a process block 1906, the process 1900 establishes compatibility between a first interface of the first version of the service and a second interface of the second version of the service.

Figure 20:
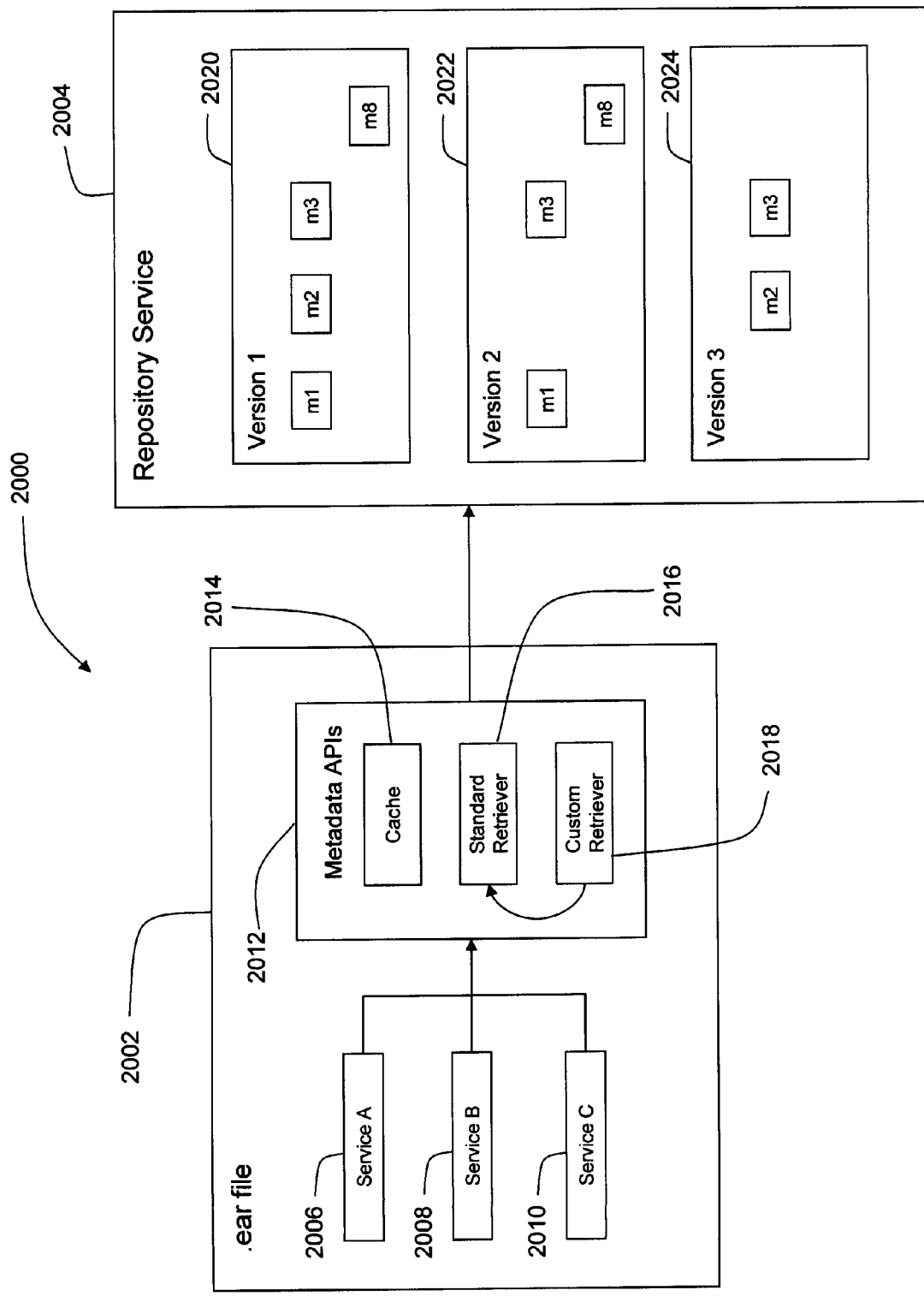
FIG. 20 illustrates a metadata configuration that utilizes metadata for continuous deployment.

FIG. 20 illustrates a metadata configuration 2000 that utilizes metadata for continuous deployment. The metadata can be utilized to determine the version of an artifact. Accordingly, by determining the version of an artifact, a compatible schema can be utilized. Further, the metadata helps identify if older versions are in use so that new versions can eventually replace the old versions. New metadata can be pushed out such that existing clients continue to function against the current versions at the same time that new clients are able to view the newly deployed version.

An Enterprise Archive (".ear") file 2002 contains an application for J2EE. One of ordinary skill in the art will recognize that different environments, e.g., .Net may have a different format than a .ear file, but can nonetheless be utilized. A service A 2006, a service B 2008, and a service C 2010 can be provided. Further, each of these services utilizes the Metadata APIs 2012, which include a cache 2014, a standard retriever 2016, and a custom retriever 2018. In addition, the Metadata APIs 2012 can retrieve metadata from different versions of an artifact, application, etc. from a repository service 2004. The first version 2020 includes various metadata denoted by "m1," "m2," "m3," and "m8." For instance, the metadata can include the version number, component name, field names, constraints, filters, etc. In addition, the second version 2022 includes various metadata denoted by "m1," "m3," and "m8." Accordingly, the second version 2022 shares some similar metadata to the first version 2020. Further, the third version 2024 includes various metadata denoted by "m2" and "m3." The third version 2024 shares some similar metadata with the first version 2020 and the second version 2022. In one embodiment, the metadata contents of each version indicate the version number the artifact, application, etc.

The Metadata APIs 2012 retrieves information, such as the version number, from a Repository Service 2004, which stores data in a repository. For instance, the standard retriever can be utilized to retrieve standard information from the Repository Service 2004. The custom retriever 2018 can indicate customized information that should be retrieved from the Repository Service 2004. The custom retriever 2018 provides a request for the customized information to the standard retriever 2016, which then retrieves standard and/or customized information from the Repository Service 2004.

After retrieving metadata contents from the Repository Service 2004, the Metadata APIs 2012 can store the metadata contents in a cache 2014. The services can then access the metadata contents from the cache 2014 during runtime. In one embodiment, the metadata contents within a version cannot be changed. Accordingly, the metadata contents can stay constant throughout deployment. Further, new metadata contents can be deployed in a new version of an artifact, application, etc. Multiple versions of artifacts, applications, etc. can exist simultaneously in runtime as each version has access to the corresponding metadata contents.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the following claims. The specification and drawings are, accordingly, to be regarded in an illustrative sense rather than a restrictive sense.

The invention claimed is:

1. A method comprising:
   generating a first module by packaging a first set of code for a first version of a service associated with a first application that executes in a first environment;
   deploying the first module to the first environment from a second environment, wherein the first environment and the second environment are distinct, and
   the first module comprises a first module interface that is configured to access the first module in the first environment and in the second environment;
   generating a second module by packaging a second set of code for a second version of the service associated with a second application that executes in the second environment; and
   deploying the second module to the first environment from the second environment, wherein
   the second module comprises
   a second module interface that is distinct from the first module interface and is configured to access the second module in the first environment and in the second environment,
   the first module and the second module are distinct,
   the first application and the second application are distinct,
   and
   the deploying the first module and the second module to the first environment permits the first module and the second module to operate simultaneously in the first environment to provide the first version of the service associated with the first application and the second version of the service associated with the second application,
   wherein,
   a first copy of the first version of the service is stored on a first server,
   a second copy of the first version of the service is stored on a second server,
   a first copy of the second version of the service is stored on the first server,
   a second copy of the second version of the service is stored on the second server,
   the first module interface has access to both the first server and the second server, and
   the second module interface has access to both the first server and the second server.

2. The method of claim 1, wherein
the second module comprises additional data not present in the first module, and
any additional material of a future version of the service is added to the second module.

3. The method of claim 1, further comprising:
deploying a first artifact for the first module, wherein
the first artifact comprises a first component of the first module; and
deploying a second artifact for the second module, wherein
the second artifact comprises a second component of the second module, and
the first and second artifacts are configured to operate simultaneously in the first environment.

4. The method of claim 3, wherein
the first artifact and the second artifact are each one of a business object, a business service, a business rule, a business event, a business process, or a module interface.

5. The method of claim 4, wherein
the first and second artifacts publish public and stable application programming interfaces (APIs) for the first module interface and the second module interface respectively, and
the public and stable APIs only permit additive changes for future versions of the service.

6. The method of claim 3, further comprising:
storing, in a repository, a first set of metadata for the first module and a second set of metadata for the second module, wherein
the repository is accessible to the first environment.

7. The method of claim 6, wherein the deploying the first module and the second module further comprises:
providing the first module and the second module to the first environment, and
installing the first module and the second module in the first environment, wherein
the first module comprises the first set of metadata,
the second module comprises the second set of metadata,
the first and second sets of metadata comprise configuration information for the first environment, and
the configuration information is configured to facilitate operation of the first and second modules in the first environment.

8. The method of claim 7, further comprising:
deploying a first version of the first artifact to the first environment, wherein
the first version of the first artifact is stored in the repository, and
the first version of the first artifact comprises
the first set of metadata configured to be used by the first version of the service;
deploying a second version of the second artifact to the first environment, wherein
the second version of the second artifact is stored in the repository,
the second version of the second artifact comprises the second set of metadata configured to be used by the first version of the service, and
the first set of metadata is distinct from the second set of metadata; and
retrieving the first and second sets of metadata from the repository, wherein
the first version of the service is configured to use the first and second sets of metadata to identify a schema that is compatible for use with the first version of the service.

9. The method of claim 6, wherein
the first set of metadata indicates a first version number of the first version of the service and the first application, and
the second set of metadata indicates a second version number of the second version of the service and the second application.

10. The method of claim 3, further comprising:
deploying a third module to a third environment, wherein
the third module comprises a third version of the service,
modifications made to the first module in the first environment triggers additional modifications made to the third module in the third environment, and
the additional modifications are made to the third module by deploying the first artifact to the third environment for the third module.

11. The method of claim 1, wherein
the first module is configured to be utilized in the first environment by a first user, at the same time that the second module is utilized in the first environment by a second user,
the second module is deployed after the first module, and
the second module is deployed while the first module is executing in the first environment.

12. The method of claim 11, wherein
the deploying the second module does not result in the first user of the first module experiencing downtime.

13. The method of claim 1, wherein
the first application comprises a first entry point for execution, and
the second application comprises a second entry point for execution.

14. The method of claim 1, wherein
the packaging of the first set of code to generate the first module comprises customizing the first set of code for a first computing platform of the first environment,
the packaging of the second set of code to generate the second module comprises customizing the second set of code for a second computing platform of the second environment, and
the first and the second computing platforms comprise disparate hardware and software components or characteristics.

15. The method of claim 1, wherein
the first set of code is compiled and linked in the second environment,
the packaging to produce the first module is performed in the second environment,
the second set of code is compiled and linked in the second environment, and
the packaging to produce the second module is performed in the second environment.

16. The method of claim 1, wherein
if the first version of the service is replaced by the second version of the service on the first server, the first user can still access the first version of the service on the second server through the first module interface.

17. The method of claim 1, wherein
the service is an application service.

18. A non-transitory machine readable medium comprising a set of instructions, which, when executed, perform a method comprising:

generating a first module by packaging a first set of code for a first version of a service associated with a first application that executes in a first environment;

deploying the first module to the first environment from a second environment, wherein
the first environment and the second environment are distinct, and
the first module comprises
a first module interface that is configured to access the first module in the first environment and in the second environment;

generating a second module by packaging a second set of code for a second version of the service associated with a second application that executes in the second environment; and deploying the second module to the first environment from the second environment, wherein
the second module comprises
a second module interface that is distinct from the first module interface and is configured to access the second module in the first environment and in the second environment,
the first module and the second module are distinct,
the first application and the second application are incompatible, and
the deploying the first module and the second module to the first environment permits the first module and the second module to operate simultaneously in the first environment to provide the first version of the service associated with the first application and the second version of the service associated with the second application, wherein
a first copy of the first version of the service is stored on a first server,
a second copy of the first version of the service is stored on a second server,
a first copy of the second version of the service is stored on the first server,
a second copy of the second version of the service is stored on the second server,
the first module interface has access to both the first server and the second server, and
the second module interface has access to both the first server and the second server.

19. The non-transitory machine readable medium of claim 18, wherein the method further comprises:
providing simultaneous access to a first user of the first module and a second user of the second module.

20. The non-transitory machine readable medium of claim 19, wherein the method further comprises:
assigning the first user to the second module, wherein the first user previously utilized the first module.

21. The non-transitory machine readable medium of claim 18, wherein the second module comprises:
additional data not present in the first module.

22. The non-transitory machine readable medium of claim 18, wherein the method further comprises:
providing the first module and the second module with access to the same set of resources.

23. The non-transitory machine readable medium of claim 18, wherein the method further comprises:
installing the second module without interrupting operation of the first module, wherein
the second module is deployed after the first module.

24. The non-transitory machine readable medium of claim 18, wherein
the first and the second versions of the service are services of an enterprise application.

25. A system comprising:
a processor; and
a memory coupled to the processor, the memory storing instructions executable by the processor to:
generate a first module by packaging a first set of code for a first version of a service associated with a first application that executes in a first environment,
deploy the first module to the first environment from a second environment, wherein
the first environment and the second environment are distinct, and
the first module comprises
a first module interface that is configured to access the first module in the first environment and in the second environment,
generate a second module by packaging a second set of code for a second version of the service associated with a second application that executes in the second environment, and
deploy the second module to the first environment from the second environment, wherein
the second module comprises
a second module interface that is distinct from the first module interface and is configured to access the second module in the first environment and in the second environment,
the first module and the second module are distinct,
the first application and the second application are distinct, and
the deploying the first module and the second module to the first environment permits the first module and the second module to operate simultaneously in the first environment to provide the first version of the service associated with the first application and the second version of the service associated with the second application, wherein
a first copy of the first version of the service is stored on a first server,
a second copy of the first version of the service is stored on a second server,
a first copy of the second version of the service is stored on the first server,
a second copy of the second version of the service is stored on the second server,
the first module interface has access to both the first server and the second server, and
the second module interface has access to both the first server and the second server.

26. The system of claim 25, wherein
compatibility is established between the first module interface of the first module and the second module interface of the second module, and
the compatibility supports multiple releases of the service in the first environment.

* * * * *

UNITED STATES PATENT AND TRADEMARK OFFICE
CERTIFICATE OF CORRECTION

PATENT NO.        : 9,542,175 B2
APPLICATION NO.   : 11/426250
DATED             : January 10, 2017
INVENTOR(S)       : Tseitlin et al.

Page 1 of 1

It is certified that error appears in the above-identified patent and that said Letters Patent is hereby corrected as shown below:

In the Specification

In Column 19, Line 20, delete "NET," and insert -- .NET, --, therefor.

In Column 23, Line 45, delete "that that" and insert -- that --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*